（12) United States Patent
Hamachi et al.

(10) Patent No.: US 11,742,774 B2
(45) Date of Patent: Aug. 29, 2023

(54) SWITCH DRIVING DEVICE AND SWITCHING POWER SUPPLY USING THE SAME

(71) Applicant: ROHM CO., LTD, Kyoto (JP)

(72) Inventors: Kenji Hamachi, Kyoto (JP); Akeyuki Komatsu, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/812,205

(22) Filed: Jul. 13, 2022

(65) Prior Publication Data
US 2022/0345051 A1 Oct. 27, 2022

Related U.S. Application Data

(63) Continuation of application No. 16/915,372, filed on Jun. 29, 2020, now Pat. No. 11,424,691.

(30) Foreign Application Priority Data

Jul. 3, 2019 (JP) .................................. 2019-124342
Mar. 18, 2020 (JP) .................................. 2020-048066

(51) Int. Cl.
H02M 7/217 (2006.01)
H02M 3/335 (2006.01)
(Continued)

(52) U.S. Cl.
CPC ............. H02M 7/217 (2013.01); H02M 3/01 (2021.05); H02M 3/33569 (2013.01);
(Continued)

(58) Field of Classification Search
CPC .... H02M 3/01; H02M 3/335; H02M 3/33569; H02M 1/0058; H02M 1/083; H02M 1/34; H02M 1/36
See application file for complete search history.

(56) References Cited

U.S. PATENT DOCUMENTS 6,304,460 B1 * 10/2001 Cuk .................... H02M 1/34
363/16
2009/0103334 A1 4/2009 Tamaki
(Continued)

FOREIGN PATENT DOCUMENTS

JP 5007966 B2 8/2012
JP 2019009989 A 1/2019

*Primary Examiner* — Gary L Laxton
(74) *Attorney, Agent, or Firm* — Chip Law Group

(57) ABSTRACT

Disclosed are a switch driving device, in which individual zero voltage switching control of a first switch element and a second switch element forming a bidirectional switch is performed, and a switching power supply including a primary winding to which an alternating-current input voltage is applied, a secondary winding electromagnetically coupled to the primary winding, the bidirectional switch connected in series with the primary winding, a resonance capacitor connected in parallel with at least one of the bidirectional switch and the primary winding, a full-wave rectifier circuit that performs full-wave rectification of an induced voltage occurring in the secondary winding, a smoothing capacitor that smooths output of the full-wave rectifier circuit, and the switch driving device that drives the bidirectional switch. The alternating-current input voltage is directly converted into a direct-current output voltage by extracting a flyback voltage or a forward voltage and the flyback voltage from the secondary winding.

8 Claims, 18 Drawing Sheets

(51) Int. Cl.
  *H02M 3/00*    (2006.01)
  *H02M 1/08*    (2006.01)
  *H02M 1/34*    (2007.01)
  *H02M 1/36*    (2007.01)
  *H02M 1/00*    (2006.01)

(52) U.S. Cl.
  CPC .......... *H02M 1/0058* (2021.05); *H02M 1/083* (2013.01); *H02M 1/34* (2013.01); *H02M 1/36* (2013.01)

(56)  References Cited

U.S. PATENT DOCUMENTS

| | | |
|---|---|---|
| 2011/0026285 A1 | 2/2011 | Kawashima et al. |
| 2012/0250369 A1 | 10/2012 | Furukawa |
| 2013/0257305 A1 | 10/2013 | Lee et al. |
| 2014/0112043 A1 | 4/2014 | Yamahira |
| 2016/0268924 A1 | 9/2016 | Fu et al. |
| 2017/0141689 A1 | 5/2017 | Hatano |
| 2018/0145595 A1 | 5/2018 | Fontana et al. |
| 2018/0375422 A1 | 12/2018 | Marumoto et al. |

\* cited by examiner

SWITCH DRIVING DEVICE AND SWITCHING POWER SUPPLY USING THE SAME

CROSS REFERENCE TO RELATED APPLICATIONS

This application is a continuation application of U.S. patent application Ser. No. 16/915,372, filed on Jun. 29, 2020, which claims priority benefit of Japanese Priority Patent Application JP 2019-124342 filed in the Japan Patent Office on Jul. 3, 2019 and JP 2020-048066 filed in the Japan Patent Office on Mar. 18, 2020. Each of the above-referenced applications is hereby incorporated herein by reference in its entirety.

BACKGROUND

The disclosure disclosed in the present specification relates to a switch driving device and a switching power supply using the same.

FIG. 20 is a diagram illustrating an existing example of a switching power supply. A switching power supply 500 in the present existing example is an isolated alternating current/direct current (AC/DC) converter that directly generates a direct-current output voltage Vout from an alternating-current input voltage Vin, and supplies the direct-current output voltage Vout to a load Z by turning on/off a bidirectional switch X (formed by switch elements 510 and 520 having a common source S) connected to an alternating-current power source P, and thus driving a transformer 540.

Incidentally, Japanese Patent Laid-Open No. 2019-9989 and Japanese Patent No. 5007966 can be cited as an example of existing technologies related to the foregoing.

SUMMARY

Incidentally, what is generally called zero voltage switching control (zero-volt switching (ZVS) control) is widely and generally known as an existing technology for suppressing heat generation of the bidirectional switch X. For example, an existing switch driving device 530 turns on both of the switch elements 510 and 520 simultaneously in timing in which a voltage across the bidirectional switch X (voltage across a resonance capacitor 552 connected in parallel with the bidirectional switch X) becomes 0 V.

However, in the above-described timing, voltages reverse to each other are applied to inherent capacitances of the respective switch elements 510 and 520 (neither of the inherent capacitances is illustrated) even when the voltage across the bidirectional switch X becomes 0 V. Therefore, when both of the switch elements 510 and 520 are simultaneously turned on in such timing, energy stored in the respective inherent capacitances is consumed by the switch elements 510 and 520. Thus, it is difficult to suppress the heat generation of the bidirectional switch X sufficiently.

In view of the above-described problems found by inventors of the present application, it is desirable to provide a switch driving device that can suppress heat generation of a bidirectional switch and a switching power supply using the same.

For example, a switch driving device disclosed in the present specification has a configuration (first configuration) in which individual zero voltage switching control of a first switch element and a second switch element forming a bidirectional switch is performed.

The switch driving device including the first configuration preferably has a configuration (second configuration) in which while one switch element of the first switch element and the second switch element is held in an on state, the other switch element is turned off, when the bidirectional switch is switched from an on state to an off state.

The switch driving device including the second configuration preferably has a configuration (third configuration) in which an inherent diode of the one switch element is forward biased, and an inherent diode of the other switch element is reverse biased.

The switch driving device including one of the first to third configurations preferably has a configuration (fourth configuration) in which when the bidirectional switch is switched from an off state to an on state, first zero voltage switching control is performed so as to turn on the other switch element in timing in which a voltage across the other switch element becomes 0 V.

The switch driving device including the fourth configuration preferably has a configuration (fifth configuration) in which when the bidirectional switch is switched from the off state to the on state, second zero voltage switching control is performed following the first zero voltage switching control so as to turn off the one switch element in timing in which the other switch element is turned on, and turn on the one switch element in timing in which a voltage across the one switch element becomes 0 V.

The switch driving device including the fifth configuration preferably has a configuration (sixth configuration) in which whether or not to perform the second zero voltage switching control is selected.

In addition, a switching power supply disclosed in the present specification has a configuration (seventh configuration) including a primary winding to which an alternating-current input voltage is applied, a secondary winding electromagnetically coupled to the primary winding, a bidirectional switch connected in series with the primary winding, a resonance capacitor connected in parallel with at least one of the bidirectional switch and the primary winding, a full-wave rectifier circuit configured to perform full-wave rectification of an induced voltage occurring in the secondary winding, a smoothing capacitor configured to smooth output of the full-wave rectifier circuit, and the switch driving device including one of the foregoing first to sixth configurations, the switch driving device driving the bidirectional switch, the alternating-current input voltage being directly converted into a direct-current output voltage by extracting a flyback voltage or both a forward voltage and the flyback voltage from the secondary winding.

The switching power supply including the seventh configuration preferably has a configuration (eighth configuration) in which the first switch element and the second switch element have a common terminal.

In addition, the switching power supply including the seventh configuration may have a configuration (ninth configuration) in which the primary winding is connected between the first switch element and the second switch element.

The switching power supply including one of the seventh to ninth configurations preferably has a configuration (tenth configuration) further including a voltage detecting circuit configured to detect a switch voltage appearing at one terminal of the bidirectional switch, in which the switch driving device performs the zero voltage switching control on the basis of the switch voltage.

In addition, the switching power supply including one of the seventh to tenth configurations may have a configuration (eleventh configuration) further including a zero voltage detecting circuit configured to detect a voltage across each of the first switch element and the second switch element, in which the switch driving device performs the zero voltage switching control on the basis of output of the zero voltage detecting circuit.

In addition, the switching power supply including one of the seventh to eleventh configurations may have a configuration (twelfth configuration) further including an auxiliary winding coupled to the primary winding and the secondary winding and a zero voltage detecting circuit configured to detect a voltage induced in the auxiliary winding, in which the switch driving device performs the zero voltage switching control on the basis of output of the zero voltage detecting circuit.

The switching power supply including one of the seventh to twelfth configurations preferably has a configuration (thirteenth configuration) further including a starting circuit configured to perform preliminary charging of the smoothing capacitor at a time of a start.

The switching power supply including the tenth configuration may have a configuration (fourteenth configuration) in which the voltage detecting circuit detects a differential voltage obtained by differentiating the switch voltage, and the switch driving device performs the zero voltage switching control on the basis of the differential voltage.

The switching power supply including the fourteenth configuration may have a configuration (fifteenth configuration) in which the switch driving device determines on/off timing of each of the first switch element and the second switch element according to a result of comparison between the differential voltage and a predetermined threshold voltage.

The switching power supply including the fifteenth configuration may have a configuration (sixteenth configuration) in which the switch driving device adjusts the threshold voltage according to at least one of a magnitude of the alternating-current input voltage and a waveform of the differential voltage.

The switching power supply including the sixteenth configuration may have a configuration (seventeenth configuration) in which the switch driving device adjusts the threshold voltage such that the smaller an absolute value of the alternating-current input voltage, or the blunter the waveform of the differential voltage, the earlier a timing of crossing of the threshold voltage by the differential voltage.

The switching power supply including the sixteenth or seventeenth configuration may have a configuration (eighteenth configuration) in which the switch driving device detects a peak value of the differential voltage, a time from a zero value to the peak value, or a slope at a time of a start of a change in the differential voltage as information regarding the waveform of the differential voltage.

The switching power supply including one of the seventh to eighteenth configurations may have a configuration (nineteenth configuration) in which the switch driving device stops the driving of the bidirectional switch when an absolute value of the alternating-current input voltage is smaller than a predetermined lower limit value.

The switching power supply including one of the seventh to nineteenth configurations may have a configuration (twentieth configuration) in which while the switch driving device holds one of the first switch element and the second switch element in an on state, the switch driving device turns on/off the other switch element, when an absolute value of the alternating-current input voltage is larger than a predetermined upper limit value.

According to the disclosure disclosed in the present specification, it is possible to provide a switch driving device that can suppress heat generation of a bidirectional switch and a switching power supply using the same.

DETAILED DESCRIPTION OF THE PREFERRED EMBODIMENTS

First Embodiment

Figure 1:
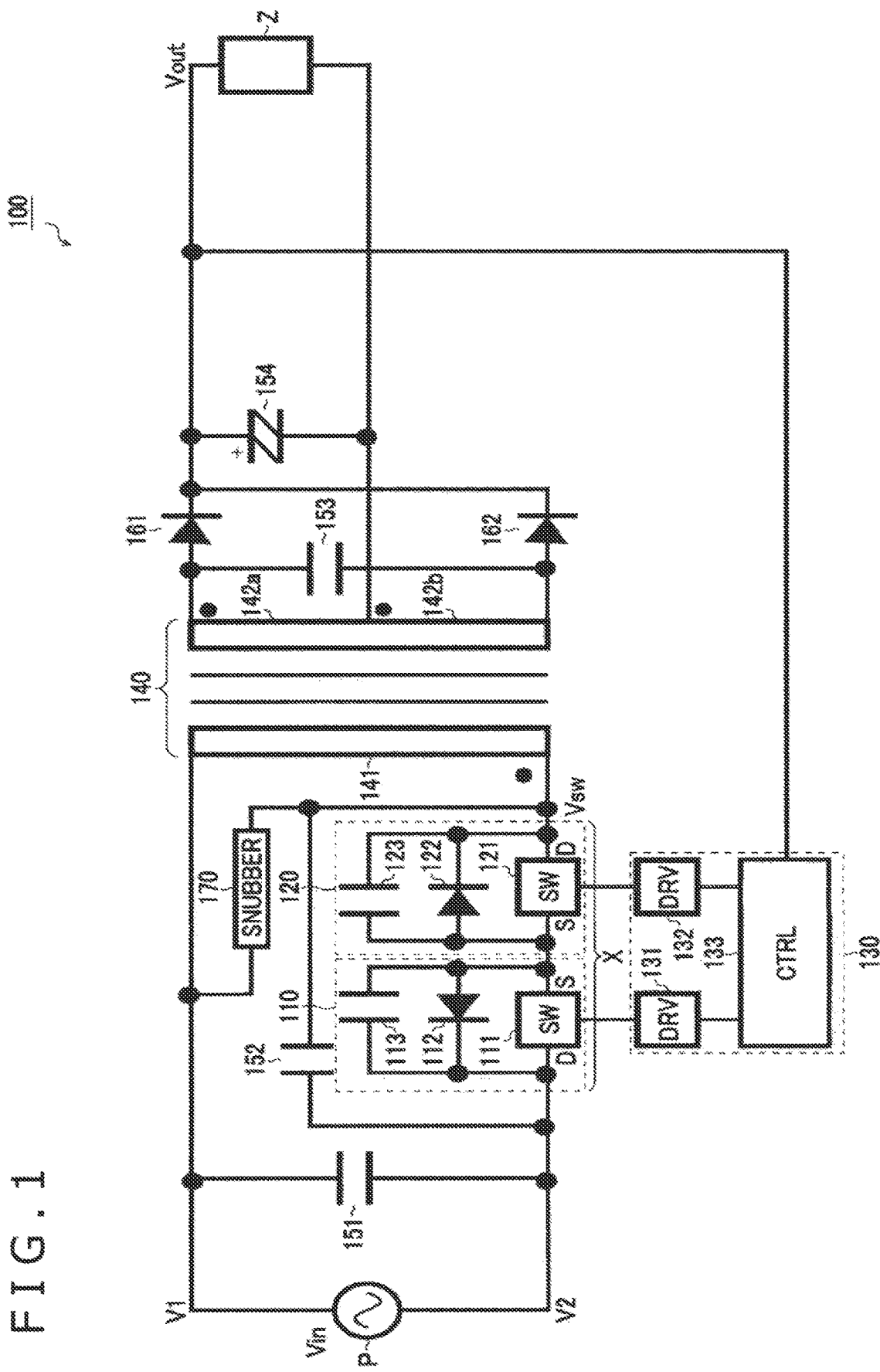
FIG. 1 is a diagram illustrating a first embodiment of a switching power supply.

FIG. 1 is a diagram illustrating a first embodiment of a switching power supply. A switching power supply 100 according to the present embodiment is an isolated AC/DC converter that directly converts an alternating-current input voltage Vin (V2−V1, for example, V1=GND) supplied from an alternating-current power source P into a direct-current output voltage Vout, and supplies the direct-current output voltage Vout to a load Z while providing electric insulation between a primary circuit system and a secondary circuit system. The switching power supply 100 includes switch elements 110 and 120, a switch driving device 130, a transformer 140, capacitors 151 to 154, diodes 161 and 162, and a snubber circuit 170.

The switch elements 110 and 120 are reversely connected in series with each other between a second node (terminal to which a voltage V2 is applied) of the alternating-current power source P and a second input tap (winding starting end of a primary winding 141) of the transformer 140. The thus connected switch elements 110 and 120 form a bidirectional switch X connected in series with the primary winding 141 of the transformer 140.

In a case where the switch elements 110 and 120 are a Si-based or SiC-based N-channel type metal oxide semiconductor field effect transistor (NMOSFET), for example, the switch elements 110 and 120 have a common source S, a drain D of the switch element 110 is connected to the second node of the alternating-current power source P, and a drain D (terminal to which a switch voltage Vsw is applied) of the switch element 120 is connected to the second input tap of the transformer 140. Incidentally, a GaN device, an insulated gate bipolar transistor (IGBT), or the like may be used as the switch elements 110 and 120.

In addition, the switch elements 110 and 120 respectively include inherent diodes 112 and 122 and inherent capacitances 113 and 123 in addition to switch functional units 111 and 121 (transistor main bodies). In the case of the present figure, a cathode of the inherent diode 112 and a first terminal of the inherent capacitance 113 are connected to the drain D of the switch functional unit 111. In addition, an anode of the inherent diode 112 and a second terminal of the inherent capacitance 113 are connected to the source S of the switch functional unit 111. On the other hand, a cathode of the inherent diode 122 and a first terminal of the inherent capacitance 123 are connected to the drain D of the switch functional unit 121. In addition, an anode of the inherent diode 122 and a second terminal of the inherent capacitance 123 are connected to the source S of the switch functional unit 121.

The switch driving device 130 includes drivers 131 and 132 generating driving signals (gate signals) for the respective switch elements 110 and 120 and a controller 133 controlling these drivers. The switch driving device 130 turns on/off each of the switch elements 110 and 120 individually.

The switch driving device 130, for example, has a function of turning on/off the bidirectional switch X such that the direct-current output voltage Vout coincides with a desired target value (output feedback control function). By providing such a function, it is possible to stably supply a constant direct-current output voltage Vout to the load Z.

In addition, the switch driving device 130 has a function of turning on/off the bidirectional switch X so as to bring a power factor of the switching power supply 100 close to one (power factor improving function). By providing such a function, it is possible to realize a single converter type switching power supply 100 because a separate power factor improving circuit may not be necessary.

Further, the switch driving device 130 has a function of performing zero voltage switching control of the switch elements 110 and 120 individually (individual ZVS function). A switching loss of the bidirectional switch X can be reduced by providing such a function. It is thus possible to suppress heat generation of the bidirectional switch X and enhance conversion efficiency of the switching power supply 100. Incidentally, the individual ZVS function will be described later in detail.

The transformer 140 includes the primary winding 141 provided to the primary circuit system and secondary windings 142a and 142b provided to the secondary circuit system and magnetically coupled to the primary winding 141. A first input tap (winding terminal end of the primary winding 141) of the transformer 140 is connected to a first node (terminal to which a voltage V1 is applied) of the alternating-current power source P. The second input tap (winding starting end of the primary winding 141) of the transformer 140 is connected to the second node (terminal to which the voltage V2 is applied) of the alternating-current power source P via the bidirectional switch X. A first output tap (winding starting end of the secondary winding 142a) of the transformer 140 is connected to an anode of the diode 161. A second output tap (winding terminal end of the secondary winding 142b) of the transformer 140 is connected to an anode of the diode 162. A third output tap (the winding terminal end of the secondary winding 142a and the winding starting end of the secondary winding 142b) of the transformer 140 is connected as a ground of the secondary circuit system to a low potential terminal of the load Z.

Figure 2:
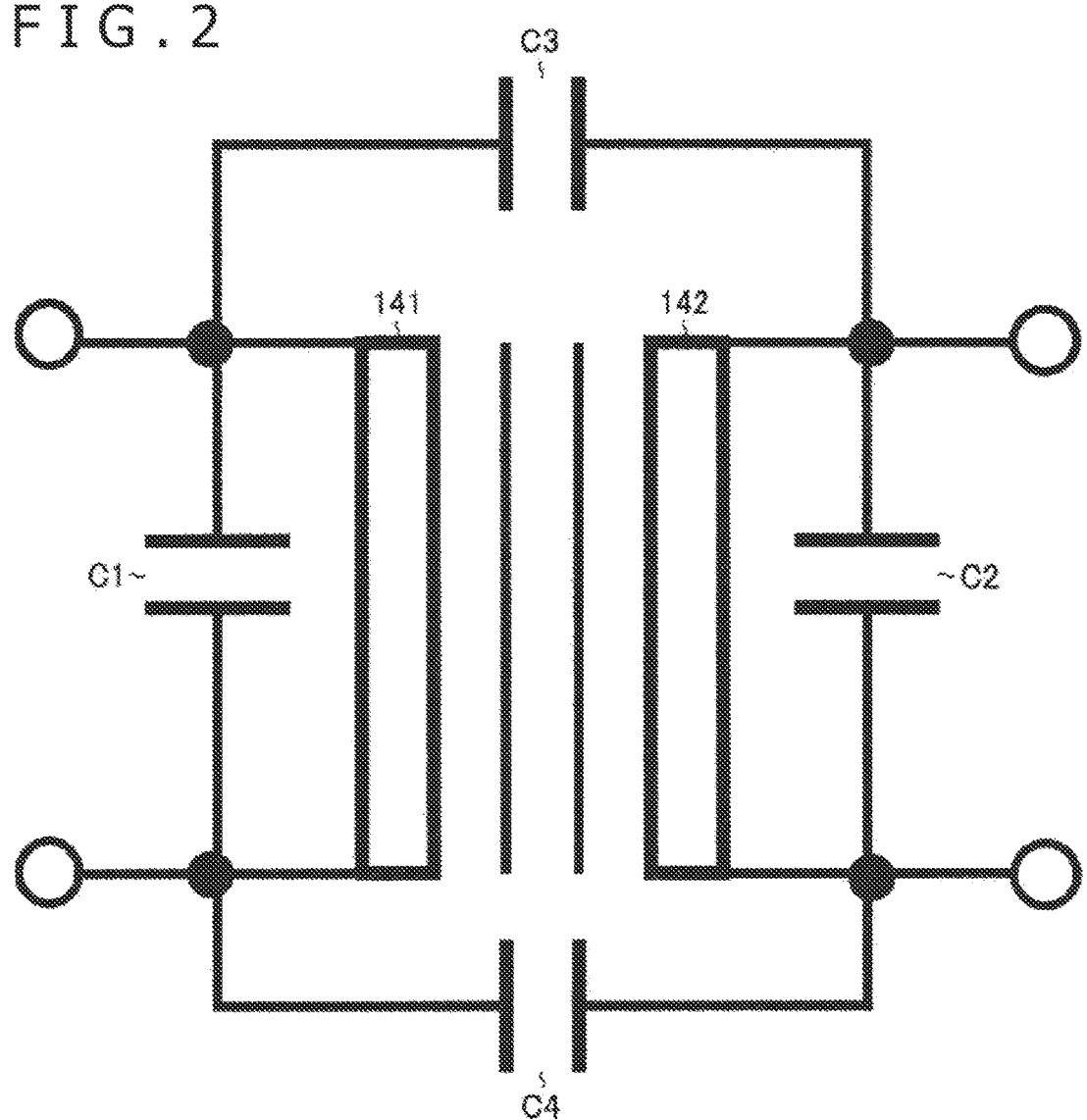
FIG. 2 is a diagram illustrating an equivalent circuit of a transformer.

Incidentally, as the transformer 140, a flyback converter circuit may be formed by using a transformer with a high degree of coupling, or a voltage resonance circuit may be formed by using a leakage transformer (resonance transformer) having a leakage inductance, or a voltage resonance circuit obtained by connecting a coil to a leakage transformer may be formed. In addition, as illustrated in FIG. 2, the transformer 140 is accompanied with stray capacitances C1 to C4.

A capacitor 151 is connected in parallel with the alternating-current power source P. The capacitor 151 functions as an input filter capacitor that removes a noise component of the alternating-current input voltage Vin.

A capacitor 152 is connected in parallel with the bidirectional switch X. The capacitor 152 functions as a resonance capacitor forming a resonance circuit together with the primary winding 141 of the transformer 140 and a leakage inductance (not illustrated). Hence, as a leakage transformer or a resonance transformer is used as the transformer 140, even when a surplus energy not supplied from the primary winding 141 to the secondary windings 142a and 142b occurs, this surplus energy can be regenerated and used. A decrease in conversion efficiency of the switching power supply 100 is therefore avoided. Incidentally, the capacitor 152 may not be necessary because of the presence of the inherent capacitances 113 and 123 of the respective switch elements 110 and 120.

A capacitor 153 is connected between the first output tap (winding starting end of the secondary winding 142a) of the transformer 140 and the second output tap (winding terminal end of the secondary winding 142b) of the transformer 140. The capacitor 153 functions as a rectifying capacitor.

A capacitor 154 is connected in parallel with the load Z. The capacitor 154 functions as a smoothing capacitor for generating the direct-current output voltage Vout by smoothing the output of a full-wave rectifier circuit (diodes 161 and 162).

Figure 3:
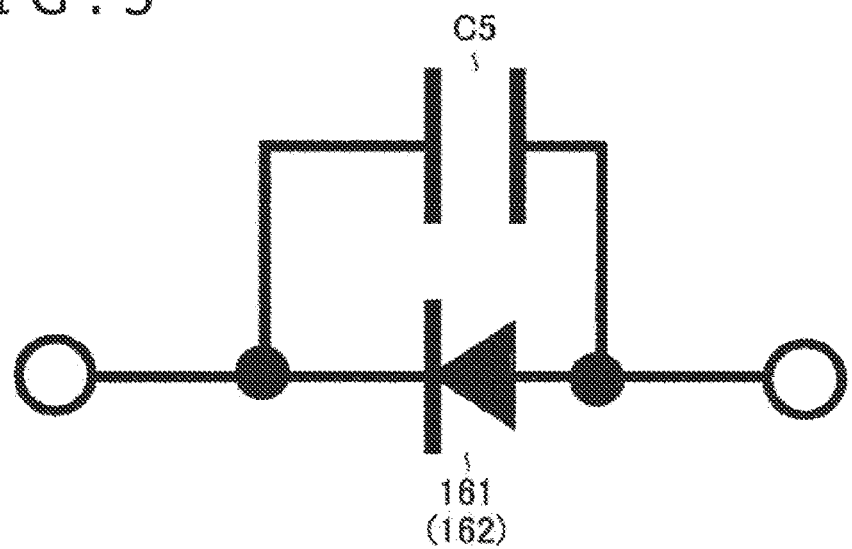
FIG. 3 is a diagram illustrating an equivalent circuit of a rectifying diode.

The anode of the diode 161 is connected to the first output tap of the transformer 140. The anode of the diode 162 is connected to the second output tap of the transformer 140. Respective cathodes of the diodes 161 and 162 are connected to a high potential terminal of the load Z as an output terminal of the direct-current output voltage Vout. The thus connected diodes 161 and 162 function as the full-wave rectifier circuit that performs full-wave rectification of an induced voltage (a flyback voltage or a forward voltage) occurring in the secondary windings 142a and 142b. Incidentally, as illustrated in FIG. 3, the diodes 161 and 162 are accompanied with an inherent capacitance C5.

The snubber circuit 170 is connected across the primary winding 141. The snubber circuit 170 plays a role of absorbing an excessive surge. However, the snubber circuit 170 can be omitted when energy variation in the transformer 140 is sufficiently moderate at an off time of the bidirectional switch X due to the action of the capacitor 152.

Incidentally, according to periodic alternating-current variation in the alternating-current input voltage Vin, an operation mode of the switching power supply 100 constituted of the above-described configuration is one of a first operation mode in which a flyback system is used singly and a second operation mode in which the flyback system and a forward system are used in conjunction with each other.

In the case of the switching power supply 100 thus using both the flyback system and the forward system, both a forward voltage and a flyback voltage appearing in the secondary windings 142a and 142b can be extracted as output. Hence, it is possible to eliminate a disadvantage of the flyback system, the disadvantage being a high peak value of a secondary current, and to directly convert the alternating-current input voltage Vin into the direct-current output voltage Vout with high efficiency even at times of application of medium and high power.

<Individual ZVS Control>

Individual ZVS control by the switch driving device 130 will next be described in detail with reference to drawings.

Figure 4:
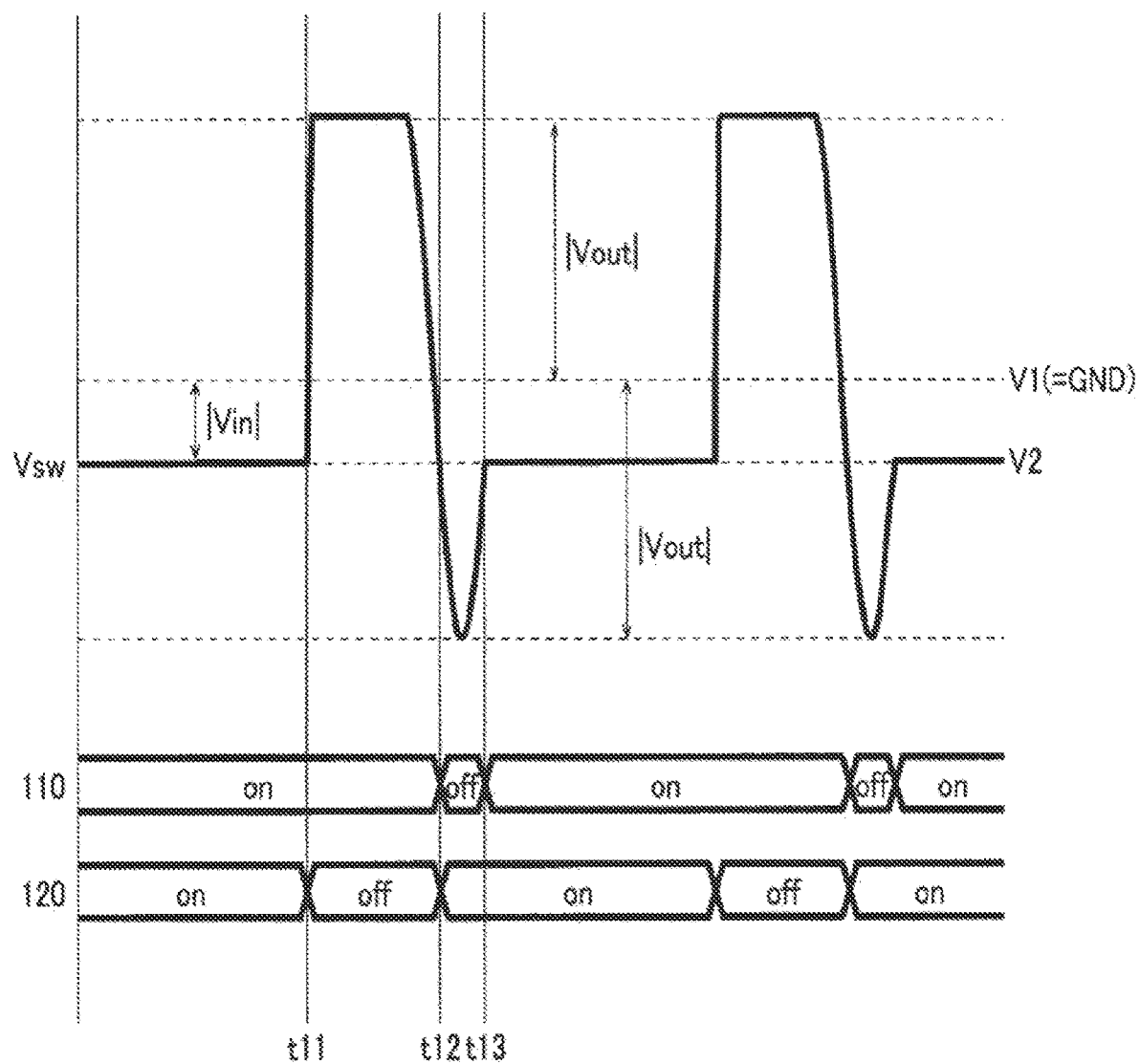
FIG. 4 is a diagram illustrating a first example of individual ZVS control.

FIG. 4 is a diagram illustrating a first example of the individual ZVS control (case where Vin<0 (V1>V2) and |Vin| is relatively small). FIG. 4 depicts, in order from a top, the switch voltage Vsw and the on/off states of the respective switch elements 110 and 120.

Before time t11, both of the switch elements 110 and 120 are on. At this time, a primary current flows in a current path from the first node (terminal to which the voltage V1 is applied) of the alternating-current power source P through the primary winding 141 and the bidirectional switch X to the second node (terminal to which the voltage V2 is applied) of the alternating-current power source P, and energy is stored in the primary winding 141. Incidentally, at this point in time, the switch voltage Vsw coincides with the voltage V2.

At time t11, when a predetermined energy is stored in the primary winding 141, the switch driving device 130 switches the bidirectional switch X from an on state to an off state. Incidentally, as for off timing of the bidirectional switch X, the passage of a predetermined time from on timing of the bidirectional switch X may be detected, or the reaching of a predetermined threshold value by an integrated value of the primary current may be detected.

At this time, the switch driving device 130 does not turn off both of the switch elements 110 and 120 at the same time, but turns off the switch element 120 (element to which a reverse voltage is applied) in which the inherent diode 122 is reverse biased while holding, in an on state, the switch element 110 (element to which a forward voltage is applied) in which the inherent diode 112 is forward biased.

Specifically, the switch driving device 130 outputs an off signal to a control terminal of the switch element 120 from the controller 133 via the driver 132 while continuing to output an on signal to a control terminal of the switch element 110 from the controller 133 via the driver 131.

Thereafter, as the switch voltage Vsw rises, a drain-to-source voltage (Vsw−V2) of the switch element 120 gradually rises while energy is stored in the inherent capacitance 123 of the switch element 120, the stray capacitances C1 to C4 of the transformer 140, and the inherent capacitance C5 of each of the diodes 161 and 162. Incidentally, the switch voltage Vsw rises until the absolute value of the switch voltage Vsw coincides with the output voltage Vout.

In addition, at this time, a voltage across the secondary winding 142a magnetically coupled to the primary winding 141 of the transformer 140 also gradually becomes higher. When the voltage across the secondary winding 142a then becomes higher than a total voltage of a voltage across the capacitor 154 and a forward drop voltage of the diode 161, a current flows into the capacitor 154 from the secondary winding 142a via the diode 161 to charge the capacitor 154.

When all of the energy stored in the transformer 140 is discharged to the capacitor 154, the switch voltage Vsw changes to decrease due to the inherent capacitance 123 of the switch element 120, the stray capacitances C1 to C4 of the transformer 140, and the inherent capacitance C5 of each of the diodes 161 and 162, and thus the drain-to-source voltage of the switch element 120 starts to decrease gradually.

Then, at time t12, when the switch voltage Vsw decreases to coincide with the voltage V2, and the drain-to-source voltage of the switch element 120 becomes 0 V, the switch driving device 130 chooses this timing to turn on the switch element 120 and simultaneously turn off the switch element 110.

Specifically, the switch driving device 130 outputs an on signal to the control terminal of the switch element 120 from the controller 133 via the driver 132, while outputting an off signal to the control terminal of the switch element 110 from the controller 133 via the driver 131.

At this time, the switch voltage Vsw decreases to a lower potential than the voltage V2 due to energy stored in the transformer 140. Thus, a drain-to-source voltage (V2−Vsw) of the switch element 110 rises, and a reverse voltage is applied to the switch element 110 (that is, the inherent diode 112 of the switch element 110 is reverse biased).

However, when the energy stored in the transformer 140 disappears, due to the inherent capacitance 113 of the switch element 110 and other capacitances, the switch voltage Vsw changes to rise, and the drain-to-source voltage of the switch element 110 starts to decrease gradually.

Then, at time t13, when the switch voltage Vsw rises to coincide with the voltage V2, and the drain-to-source voltage of the switch element 110 becomes 0 V, the switch driving device 130 chooses this timing to turn on the switch element 110 while holding the switch element 120 in an on state.

Specifically, the switch driving device 130 outputs an on signal to the control terminal of the switch element 110 from the controller 133 via the driver 131 while continuing to output an on signal to the control terminal of the switch element 120 from the controller 133 via the driver 132.

Thus, when the switch driving device 130 switches the bidirectional switch X from an off state to an on state, the switch driving device 130 performs first ZVS control so as to turn on the switch element 120 thus far held in an off state in timing in which the voltage across the switch element 120 becomes 0 V, and following the first ZVS control, performs second ZVS control so as to turn off the switch element 110 in timing of turning on the switch element 120, and turn on the switch element 110 in timing in which the voltage across the switch element 110 becomes 0 V.

By repeating the above switching control, at times of an on transition of the bidirectional switch X, it is possible to turn on each of the switch elements 110 and 120 individually in timing in which no charge is stored in the inherent capacitances 113 and 123 of the respective switch elements 110 and 120. Hence, a switching loss of each of the switch elements 110 and 120 can be brought infinitely close to zero. It is therefore possible to suppress heat generation of the bidirectional switch X.

Incidentally, in the present figure, the resonance energy of the primary winding 141 is released in a short time. Thus, a decrease in switching frequency at a time of a low input voltage can be suppressed. In addition, when a decrease in the switching frequency is suppressed, a switching current is reduced, and therefore a decrease in efficiency can also be suppressed. In addition, because the transformer 140 can be miniaturized, a smaller and highly efficient switching power supply 100 can be realized.

Figure 5:
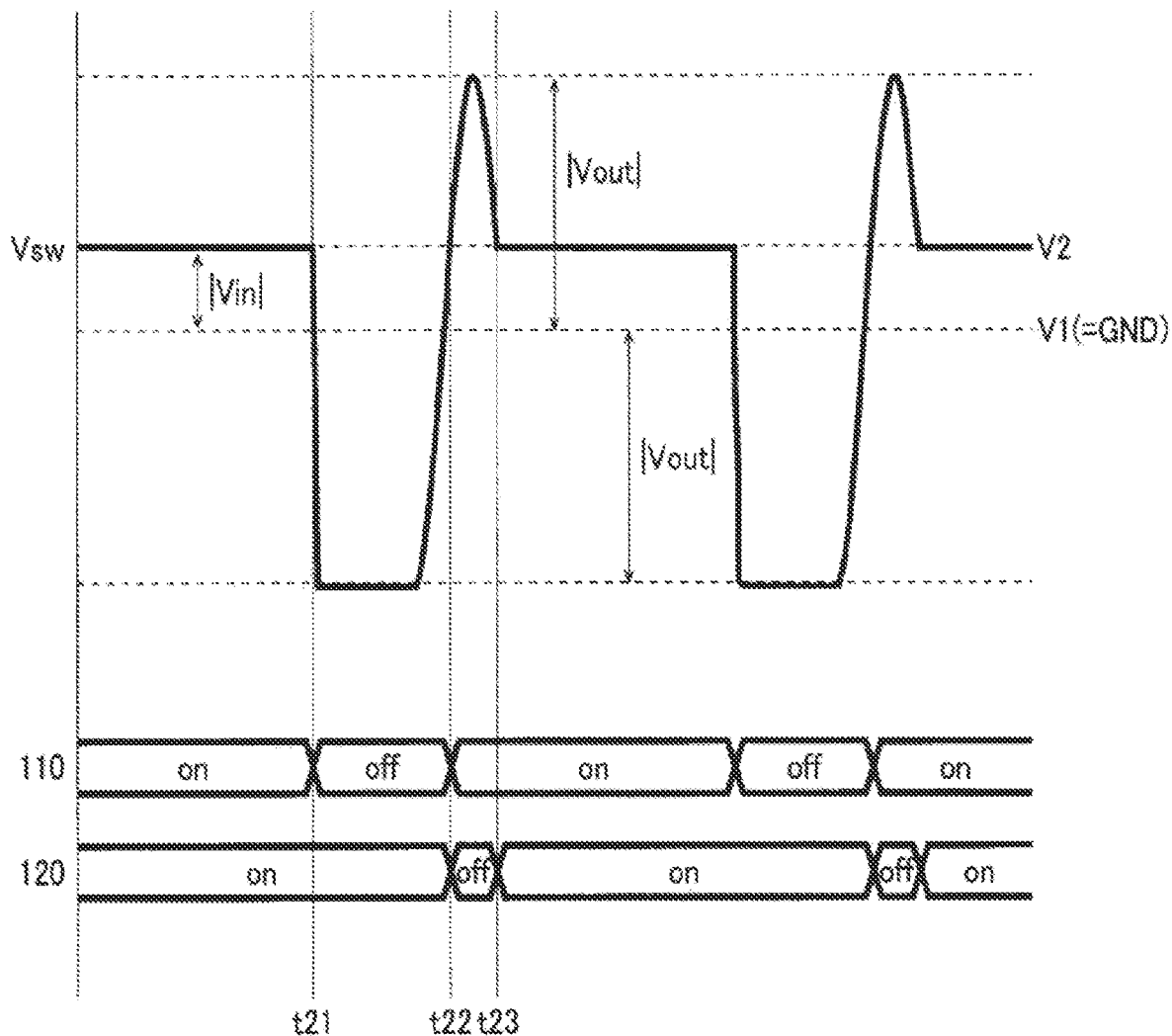
FIG. 5 is a diagram illustrating a second example of the individual ZVS control.

FIG. 5 is a diagram illustrating a second example of the individual ZVS control (case where Vin>0 (V1<V2) and |Vin| is relatively small). FIG. 5 depicts, in order from a top, the switch voltage Vsw and the on/off states of the respective switch elements 110 and 120.

Before time t21, both of the switch elements 110 and 120 are on. At this time, a primary current flows in a current path from the second node (terminal to which the voltage V2 is applied) of the alternating-current power source P through the bidirectional switch X and the primary winding 141 to the first node (terminal to which the voltage V1 is applied) of the alternating-current power source P, and energy is stored in the primary winding 141. Incidentally, at this point in time, the switch voltage Vsw coincides with the voltage V2.

At time t21, when a predetermined energy is stored in the primary winding 141, the switch driving device 130 switches the bidirectional switch X from an on state to an off state. As described earlier, as for off timing of the bidirectional switch X, the passage of a predetermined time from on timing of the bidirectional switch X may be detected, or the reaching of a predetermined threshold value by an integrated value of the primary current may be detected.

At this time, the switch driving device 130 does not turn off both of the switch elements 110 and 120 at the same time, but turns off the switch element 110 (element to which a reverse voltage is applied) in which the inherent diode 112 is reverse biased while holding, in an on state, the switch element 120 (element to which a forward voltage is applied) in which the inherent diode 122 is forward biased.

Specifically, the switch driving device 130 outputs an off signal to the control terminal of the switch element 110 from the controller 133 via the driver 131 while continuing to output an on signal to the control terminal of the switch element 120 from the controller 133 via the driver 132.

Thereafter, as the switch voltage Vsw decreases, the drain-to-source voltage (V2−Vsw) of the switch element 110 gradually rises while energy is stored in the inherent capacitance 113 of the switch element 110, the stray capacitances C1 to C4 of the transformer 140, and the inherent capacitance C5 of each of the diodes 161 and 162. Incidentally, the switch voltage Vsw decreases until the absolute value of the switch voltage Vsw coincides with the output voltage Vout.

In addition, at this time, a voltage across the secondary winding 142b magnetically coupled to the primary winding 141 of the transformer 140 also gradually becomes higher. When the voltage across the secondary winding 142b then becomes higher than a total voltage of a voltage across the capacitor 154 and a forward drop voltage of the diode 162, a current flows into the capacitor 154 from the secondary winding 142b via the diode 162 to charge the capacitor 154.

When all of the energy stored in the transformer 140 is discharged to the capacitor 154, the switch voltage Vsw changes to rise due to the inherent capacitance 113 of the switch element 110, the stray capacitances C1 to C4 of the transformer 140, and the inherent capacitance C5 of each of the diodes 161 and 162, and thus the drain-to-source voltage of the switch element 110 starts to decrease gradually.

Then, at time t22, when the switch voltage Vsw rises to coincide with the voltage V2, and the drain-to-source voltage of the switch element 110 becomes 0 V, the switch driving device 130 chooses this timing to turn on the switch element 110 and simultaneously turn off the switch element 120.

Specifically, the switch driving device 130 outputs an off signal to the control terminal of the switch element 120 from the controller 133 via the driver 132, while outputting an on signal to the control terminal of the switch element 110 from the controller 133 via the driver 131.

At this time, the switch voltage Vsw rises to a higher potential than the voltage V2 due to energy stored in the transformer 140. Thus, the drain-to-source voltage (Vsw−V2) of the switch element 120 rises, and a reverse voltage is applied to the switch element 120 (that is, the inherent diode 122 of the switch element 120 is reverse biased).

However, when the energy stored in the transformer 140 disappears, due to the inherent capacitance 123 of the switch element 120 and other capacitances, the switch voltage Vsw changes to decrease, and the drain-to-source voltage of the switch element 120 starts to decrease gradually.

Then, at time t23, when the switch voltage Vsw decreases to coincide with the voltage V2, and the drain-to-source voltage of the switch element 120 becomes 0 V, the switch driving device 130 chooses this timing to turn on the switch element 120 while holding the switch element 110 in an on state.

Specifically, the switch driving device 130 outputs an on signal to the control terminal of the switch element 120 from the controller 133 via the driver 132 while continuing to output an on signal to the control terminal of the switch element 110 from the controller 133 via the driver 131.

Thus, when the switch driving device 130 switches the bidirectional switch X from an off state to an on state, the switch driving device 130 performs first ZVS control so as to turn on the switch element 110 thus far held in an off state in timing in which the voltage across the switch element 110 becomes 0 V, and following the first ZVS control, performs second ZVS control so as to turn off the switch element 120 in timing of turning on the switch element 110, and turn on the switch element 120 in timing in which the voltage across the switch element 120 becomes 0 V.

By repeating the above switching control, at times of an on transition of the bidirectional switch X, it is possible to turn on each of the switch elements 110 and 120 individually in timing in which no charge is stored in the inherent capacitances 113 and 123 of the respective switch elements 110 and 120. Hence, a switching loss of each of the switch elements 110 and 120 can be brought infinitely close to zero. It is therefore possible to suppress heat generation of the bidirectional switch X.

Incidentally, in the switching power supply 100, as resonance operation is performed, a forward voltage and a reverse voltage can be applied respectively to the switch elements 110 and 120. Hence, the individual ZVS control described above is effective in realizing a highly efficient switching power supply 100.

In addition, the above-described individual ZVS control is switched to one of the first example (FIG. 4) and the second example (FIG. 5) each time the positive or negative polarity of the alternating-current input voltage Vin is reversed. However, the above-described individual ZVS control can be applied without any problem at all even when the input voltage of the switching power supply 100 is fixed to positive or negative voltage. For example, in a case where the input voltage of the switching power supply 100 is fixed to negative voltage (V1>V2), the individual ZVS control in the first example (FIG. 4) is performed. Conversely, in a case where the input voltage of the switching power supply 100 is fixed to positive voltage (V1<V2), the individual ZVS control in the second example (FIG. 5) is performed.

Figure 6:
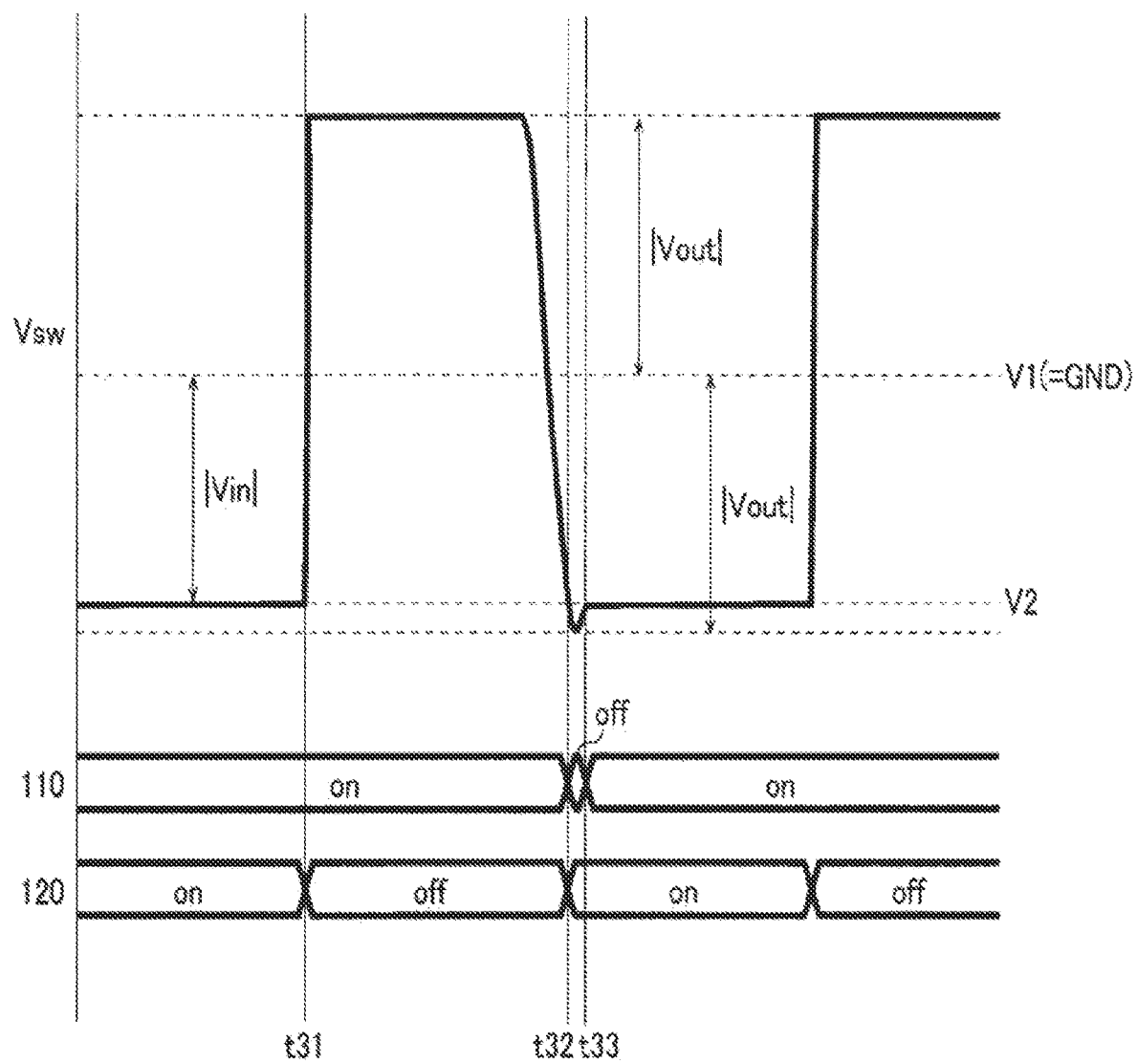
FIG. 6 is a diagram illustrating a third example of the individual ZVS control.

FIG. 6 is a diagram illustrating a third example of the individual ZVS control (case where Vin<0 (V1>V2) and |Vin| is relatively large). FIG. 6 depicts, in order from a top, the switch voltage Vsw and the on/off states of the respective switch elements 110 and 120.

The individual ZVS control in the third example is basically similar to that of the aforementioned first example (FIG. 4). The operation itself of the individual ZVS control in the third example can therefore be understood by reading "time t11," "time t12," and "time t13" in the earlier description as "time t31," "time t32," and "time t33," respectively.

However, in the case where |Vin| is relatively large, a time of application of the reverse voltage to the switch element 110 becomes very short, as indicated by a time from t32 to t33. It is therefore to be noted that timing control from the turning off of the switch element 110 to the turning on of the switch element 110 again becomes severe.

Incidentally, while the case where Vin<0 (V1>V2) is illustrated in the present figure, it is needless to say that the same is true for the case where Vin>0 (V1<V2).

Figure 7:
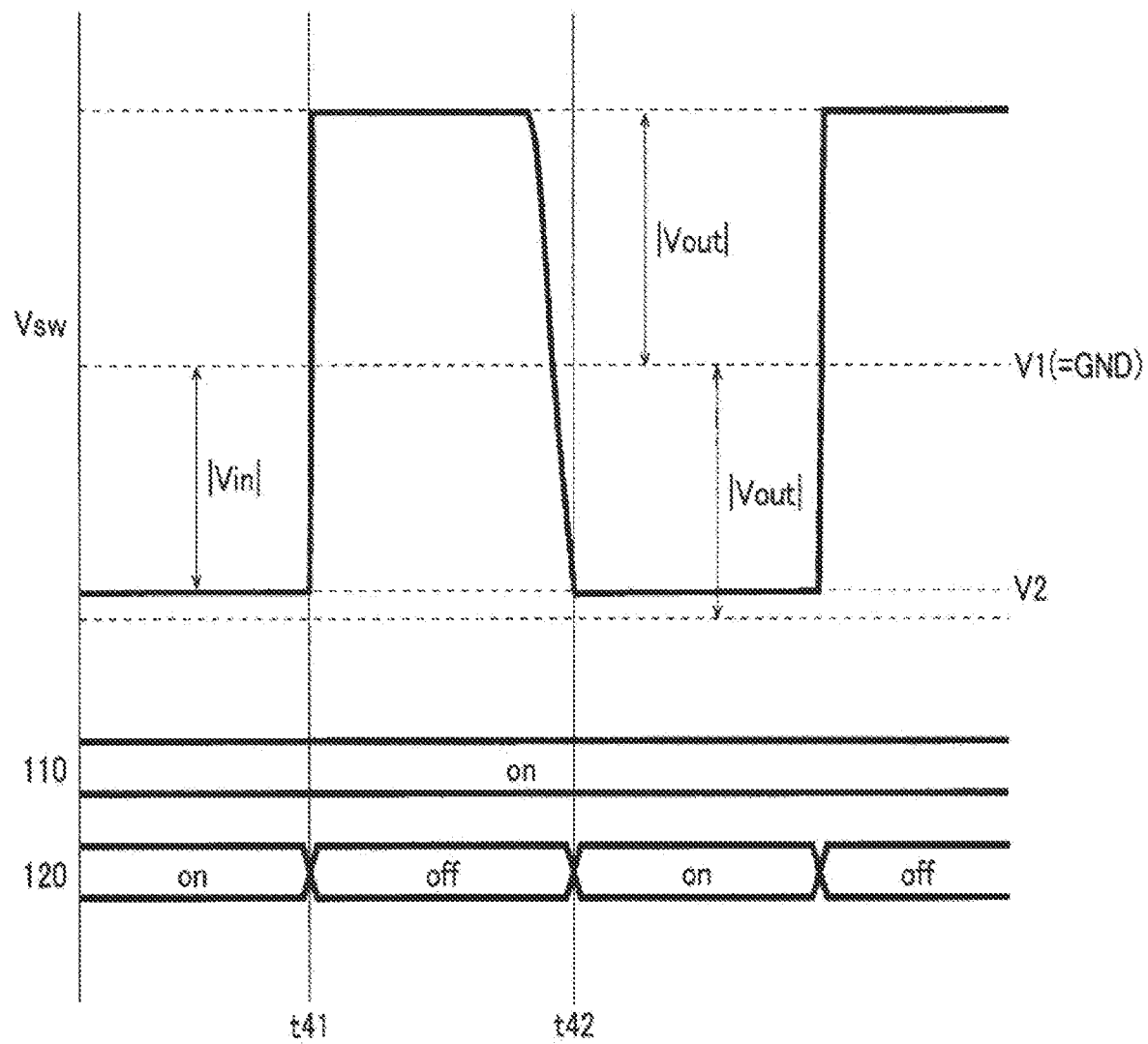
FIG. 7 is a diagram illustrating a fourth example of the individual ZVS control.

FIG. 7 is a diagram illustrating a fourth example of the individual ZVS control (case where the second ZVS control is not performed in the previous third example). FIG. 7 depicts, in order from a top, the switch voltage Vsw and the on/off states of the respective switch elements 110 and 120.

The individual ZVS control in the fourth example has a characteristic in that the second ZVS control (ZVS control of the switch element 110) is not performed in view of the point to be noted as described in the aforementioned third example (FIG. 6). In the following, description of a series of operations will be made including parts overlapping the aforementioned first example (FIG. 4).

Before time t41, both of the switch elements 110 and 120 are on. At this time, a primary current flows in a current path from the first node (terminal to which the voltage V1 is applied) of the alternating-current power source P through the primary winding 141 and the bidirectional switch X to the second node (terminal to which the voltage V2 is applied) of the alternating-current power source P, and energy is stored in the primary winding 141. Incidentally, at this point in time, the switch voltage Vsw coincides with the voltage V2.

At time t41, when a predetermined energy is stored in the primary winding 141, the switch driving device 130 switches the bidirectional switch X from an on state to an off state. As described earlier, as for off timing of the bidirectional switch X, the passage of a predetermined time from on timing of the bidirectional switch X may be detected, or the reaching of a predetermined threshold value by an integrated value of the primary current may be detected.

At this time, the switch driving device 130 does not turn off both of the switch elements 110 and 120 at the same time, but turns off the switch element 120 (element to which a reverse voltage is applied) in which the inherent diode 122 is reverse biased while holding, in an on state, the switch element 110 (element to which a forward voltage is applied) in which the inherent diode 112 is forward biased.

Specifically, the switch driving device 130 outputs an off signal to the control terminal of the switch element 120 from the controller 133 via the driver 132 while continuing to output an on signal to the control terminal of the switch element 110 from the controller 133 via the driver 131.

Thereafter, as the switch voltage Vsw rises, the drain-to-source voltage (Vsw−V2) of the switch element 120 gradually rises while energy is stored in the inherent capacitance 123 of the switch element 120, the stray capacitances C1 to C4 of the transformer 140, and the inherent capacitance C5 of each of the diodes 161 and 162. Incidentally, the switch voltage Vsw rises until the absolute value of the switch voltage Vsw coincides with the output voltage Vout.

In addition, at this time, a voltage across the secondary winding 142a magnetically coupled to the primary winding 141 of the transformer 140 also gradually becomes higher. When the voltage across the secondary winding 142a then becomes higher than a total voltage of a voltage across the capacitor 154 and a forward drop voltage of the diode 161, a current flows into the capacitor 154 from the secondary winding 142a via the diode 161 to charge the capacitor 154.

When all of the energy stored in the transformer 140 is discharged to the capacitor 154, the switch voltage Vsw changes to decrease due to the inherent capacitance 123 of the switch element 120, the stray capacitances C1 to C4 of the transformer 140, and the inherent capacitance C5 of each of the diodes 161 and 162, and thus the drain-to-source voltage of the switch element 120 starts to decrease gradually.

Then, at time t42, when the switch voltage Vsw decreases to coincide with the voltage V2, and the drain-to-source voltage of the switch element 120 becomes 0 V, the switch driving device 130 chooses this timing to turn on the switch element 120 while holding the switch element 110 in an on state.

Specifically, the switch driving device 130 continues to output an on signal to the control terminal of the switch element 110 from the controller 133 via the driver 131, and outputs an on signal to the control terminal of the switch element 120 from the controller 133 via the driver 132.

At this time, energy stored in the transformer 140 is regenerated in the alternating-current power source P. Incidentally, when all of the energy in the transformer 140 disappears, the transformer 140 starts to store energy again.

As described above, in the individual ZVS control in the fourth example, the ZVS control of the switch element 110 (second ZVS control) is omitted, and only the high-frequency switching of the switch element 120 (first ZVS control) is performed while the switch element 110 continues to be held in an on state at all times.

Hence, even in the case where |Vin| is relatively large, and the time of application of the reverse voltage to the switch element 110 becomes very short, heat generation of the bidirectional switch X can be suppressed without need of severe timing control.

Incidentally, though not illustrated anew, in the case where Vin>0 (V1<V2), only the high-frequency switching of the switch element 110 (first ZVS control) is performed while the switch element 120 continues to be held in an on state at all times.

In addition, the switch driving device 130 preferably has a function of selecting whether or not to perform the second ZVS control (that is, whether to perform the individual ZVS control in the first to third examples (FIGS. 4 to 6) or whether to perform the individual ZVS control in the fourth example (FIG. 7)) according to the alternating-current input voltage Vin or a predetermined condition.

Second Embodiment

Figure 8:
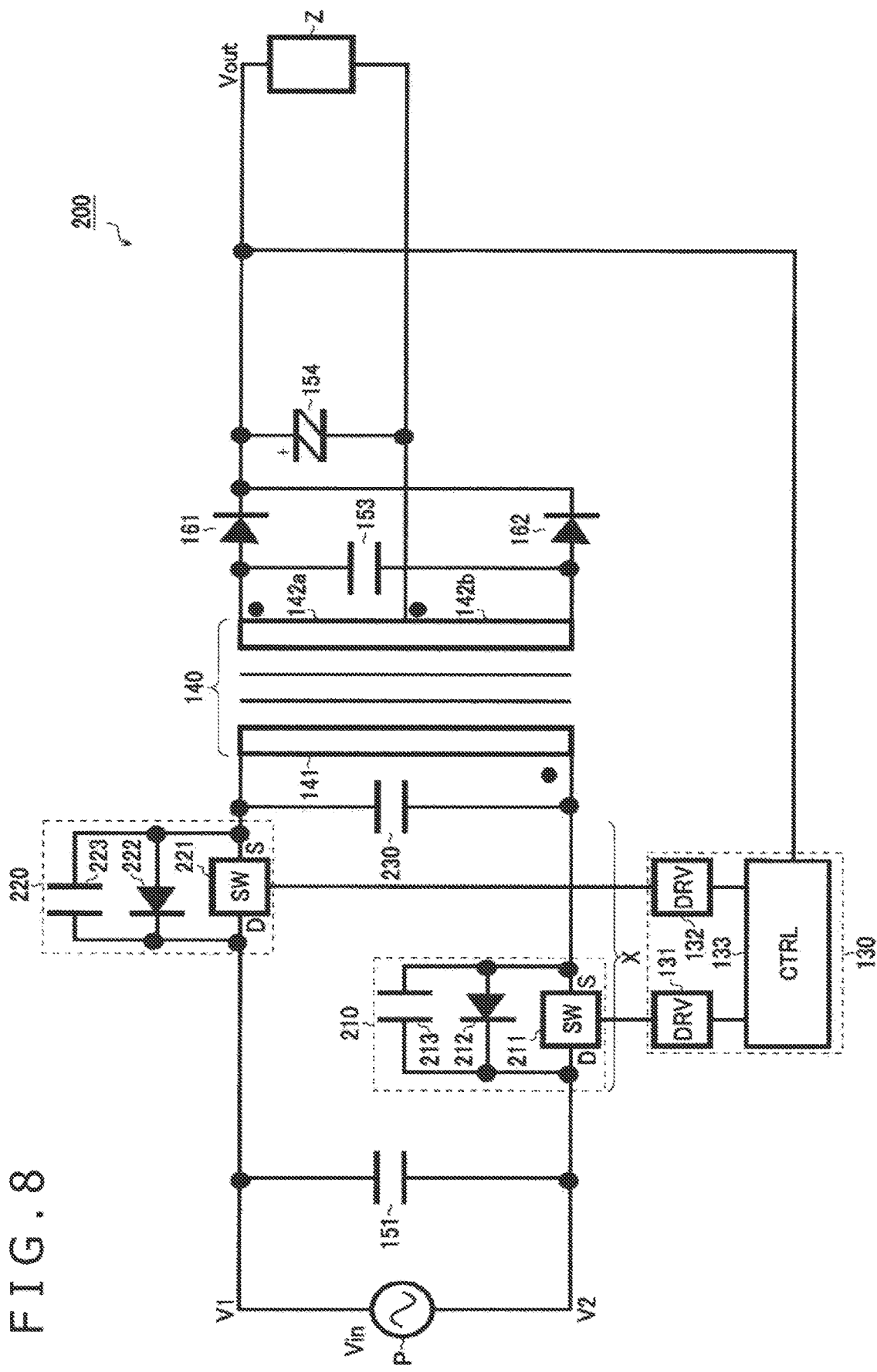
FIG. 8 is a diagram illustrating a second embodiment of the switching power supply.

FIG. 8 is a diagram illustrating a second embodiment of the switching power supply. While a switching power supply 200 according to the present embodiment is based on the first embodiment (FIG. 1), the switching power supply 200 includes switch elements 210 and 220 and a capacitor 230 in place of the switch elements 110 and 120 and the capacitor 152. The following description will be made focusing on this change.

The switch element 210 is connected between the second node (terminal to which the voltage V2 is applied) of the alternating-current power source P and the second input tap (winding starting end of the primary winding 141) of the transformer 140. On the other hand, the switch element 220 is connected between the first node (terminal to which the voltage V1 is applied) of the alternating-current power source P and the first input tap (winding terminal end of the primary winding 141) of the transformer 140. That is, the primary winding 141 is connected between the switch element 210 and the switch element 220.

Incidentally, the switch elements 210 and 220 respectively include inherent diodes 212 and 222 and inherent capacitances 213 and 223 in addition to switch functional units 211 and 221 (transistor main bodies). In the case of the present figure, a cathode of the inherent diode 212 and a first terminal of the inherent capacitance 213 are connected to a drain D of the switch functional unit 211. In addition, an anode of the inherent diode 212 and a second terminal of the inherent capacitance 213 are connected to a source S of the switch functional unit 211. On the other hand, a cathode of the inherent diode 222 and a first terminal of the inherent capacitance 223 are connected to a drain D of the switch functional unit 221. In addition, an anode of the inherent diode 222 and a second terminal of the inherent capacitance 223 are connected to a source S of the switch functional unit 221.

Thus, the switch elements 210 and 220 forming a bidirectional switch X are arranged in a separated manner so as to sandwich the primary winding 141.

In addition, unlike the aforementioned capacitor 152, the capacitor 230 is connected in series with the bidirectional switch X (connected in parallel with the primary winding 141).

Incidentally, the switching power supply 200 according to the present embodiment can also achieve effects similar to the foregoing effects by performing the individual ZVS control described thus far (individual ZVS control may be any of the first to fourth examples) in on/off driving of the bidirectional switch X.

Third Embodiment

Figure 9:
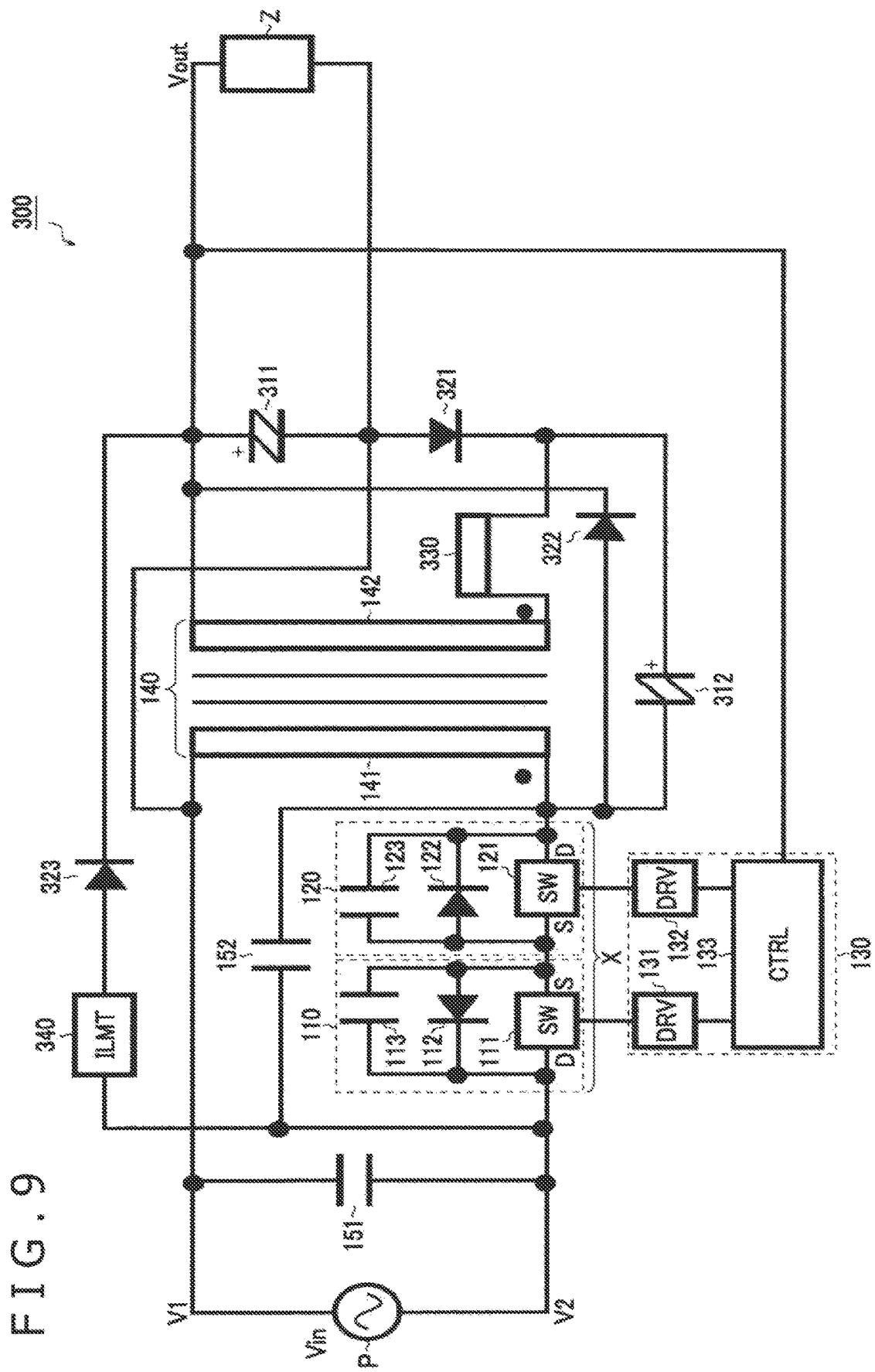
FIG. 9 is a diagram illustrating a third embodiment of the switching power supply.

FIG. 9 is a diagram illustrating a third embodiment of the switching power supply. While a switching power supply 300 according to the present embodiment is based on the first embodiment (FIG. 1), the switching power supply 300 includes a secondary winding 142, capacitors 311 and 312, diodes 321 to 323, an auxiliary winding 330, and a current limiting element 340 in place of the secondary windings 142a and 142b, the capacitors 153 and 154, and the diodes 161 and 162. The following description will be made focusing on this change.

The first output tap (winding terminal end of the secondary winding 142) of the transformer 140 is connected as the output terminal of the output voltage Vout to the high potential terminal of the load Z. Incidentally, the low potential terminal of the load Z is connected to the first input tap (winding terminal end of the primary winding 141) of the transformer 140. The second output tap (winding starting end of the secondary winding 142) of the transformer 140 is connected to a first terminal of the auxiliary winding 330.

The capacitor 311 is connected in parallel with the load Z. The capacitor 312 is connected between the second input tap (winding starting end of the primary winding 141) of the transformer 140 and a second terminal of the auxiliary winding 330.

An anode of the diode 321 is connected to the first input tap of the transformer 140. A cathode of the diode 321 is connected to the second terminal of the auxiliary winding 330. An anode of the diode 322 is connected to the second input tap of the transformer 140. A cathode of the diode 322 is connected to the first output tap of the transformer 140. An anode of the diode 323 is connected to the second terminal (terminal to which the voltage V2 is applied) of the alternating-current power source P via the current limiting element 340. A cathode of the diode 323 is connected to the first output tap of the transformer 140.

A basic operation of the switching power supply 300 will be described. In a case where the alternating-current input voltage Vin is positive (V1<V2), for example, a limited current flows in a current path from the second node (terminal to which the voltage V2 is applied) of the alternating-current power source P through the current limiting element 340, the diode 323, the secondary winding 142, and the auxiliary winding 330 to the capacitor 312, and the capacitor 312 is charged.

When the bidirectional switch X is turned on, a primary current flows through the primary winding 141 of the transformer 140, and energy is stored in the primary winding 141. When a predetermined energy is stored, the bidirectional switch X is turned off. At this time, voltages at the second input tap (winding starting end of the primary winding 141) of the transformer 140 and the second output tap (winding starting end of the secondary winding 142) of the transformer 140 are gradually decreased at substantially the same voltage decrease rate. Hence, no short-circuit current flows through the capacitor 312.

When the voltage applied to the second input tap of the transformer 140 becomes lower than a total voltage of a voltage across the capacitor 312 and a forward drop voltage of the diode 321, a current flows into the capacitor 312 via the diode 321 to charge the capacitor 312. Further, energy stored in the capacitor 312 is used to charge the capacitor 311 via the auxiliary winding 330 and the secondary winding 142. When all of the energy of the transformer 140 is thereafter discharged to the capacitor 312, the bidirectional switch X is turned on again in appropriate timing.

Next, in a state in which the capacitors 311 and 312 are already charged and in a case where the alternating-current input voltage Vin is negative (V1>V2), when the bidirectional switch X is turned on, a primary current flows through the primary winding 141 of the transformer 140, and energy is stored in the primary winding 141. When a predetermined energy is stored, the bidirectional switch X is turned off. At this time, the voltages at the second input tap (winding starting end of the primary winding 141) of the transformer 140 and the second output tap (winding starting end of the secondary winding 142) of the transformer 140 gradually increase at substantially the same voltage increase rate. Hence, no short-circuit current flows through the capacitor 312.

When the voltage applied to the second input tap of the transformer 140 becomes higher than a total voltage of a voltage across the capacitor 311 and a forward drop voltage of the diode 322, a current flows into the capacitor 311 via the diode 322 to charge the capacitor 311. When all of the energy of the transformer 140 is thereafter discharged to the capacitor 311, the bidirectional switch X is turned on again in appropriate timing.

Incidentally, the switching power supply 300 according to the present embodiment can also achieve effects similar to the foregoing effects by performing the individual ZVS control described thus far (individual ZVS control may be any of the first to fourth examples) in on/off driving of the bidirectional switch X.

Fourth Embodiment

Figure 10:
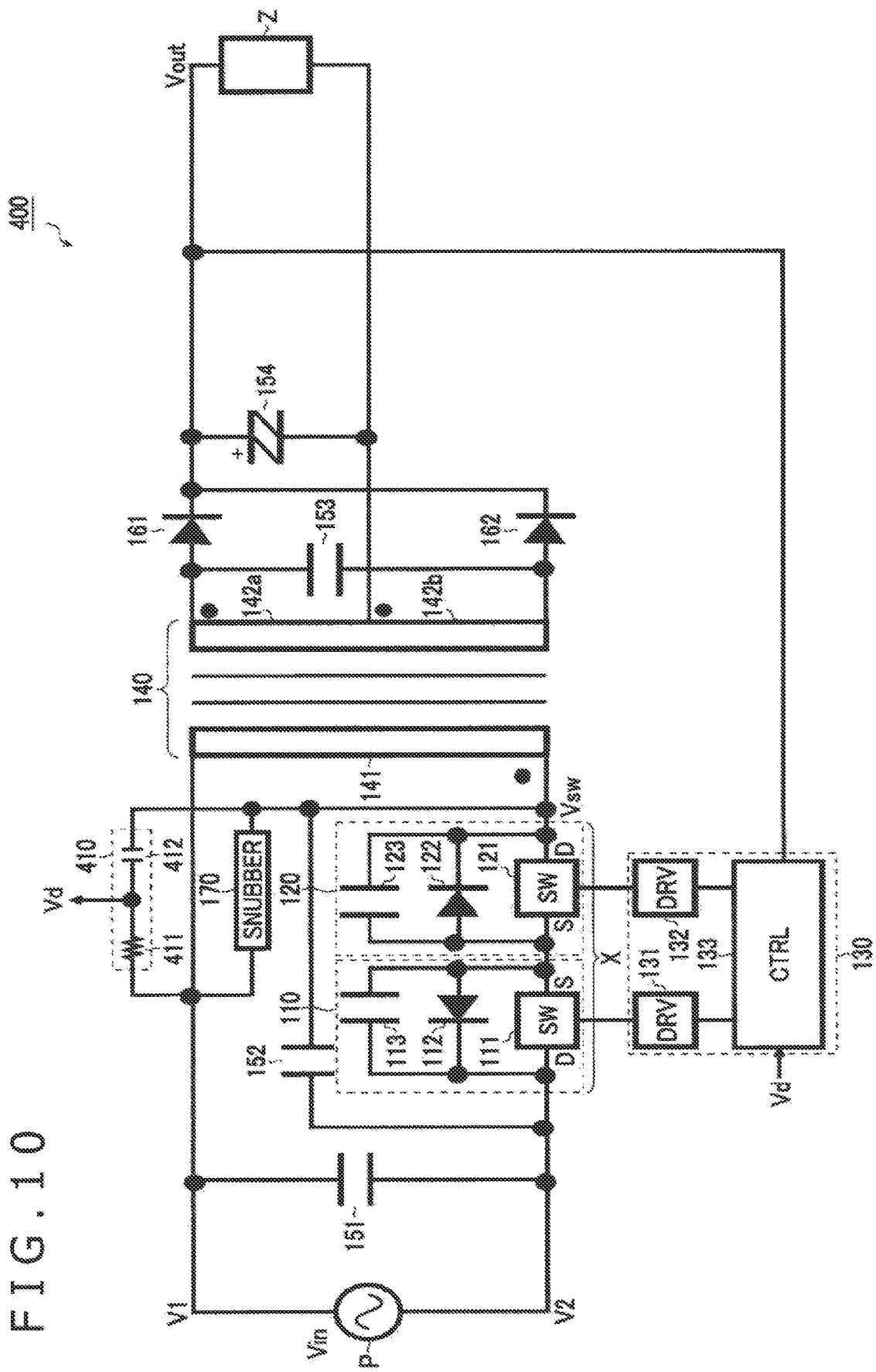
FIG. 10 is a diagram illustrating a fourth embodiment of the switching power supply.

FIG. 10 is a diagram illustrating a fourth embodiment of the switching power supply. While a switching power supply 400 according to the present embodiment is based on the first embodiment (FIG. 1), the switching power supply 400 includes a differentiating circuit 410 as measures for detecting zero cross timing for the individual ZVS control described above.

The differentiating circuit 410 includes a resistance 411 and a capacitor 412. The differentiating circuit 410 generates a differential voltage Vd by differentiating the switch voltage Vsw appearing at one terminal of the bidirectional switch X. A first terminal of the resistance 411 is connected to the first input tap (winding terminal end of the primary winding 141) of the transformer 140. A second terminal of the resistance 411 and a first terminal of the capacitor 412 are both connected to an output terminal of the differential voltage Vd. A second terminal of the capacitor 412 is connected to the second input tap (winding starting end of the primary winding 141) of the transformer 140.

The switch driving device 130 performs the individual ZVS control of the switch elements 110 and 120 on the basis of the above-described differential voltage Vd. For example, the switch driving device 130 determines the on/off timing of the switch elements 110 and 120 on the basis of a result of comparison of the differential voltage Vd with predetermined threshold voltages VH and VL (where VL<0<VH). In the following, description will be made in detail with reference to drawings.

Figure 11:
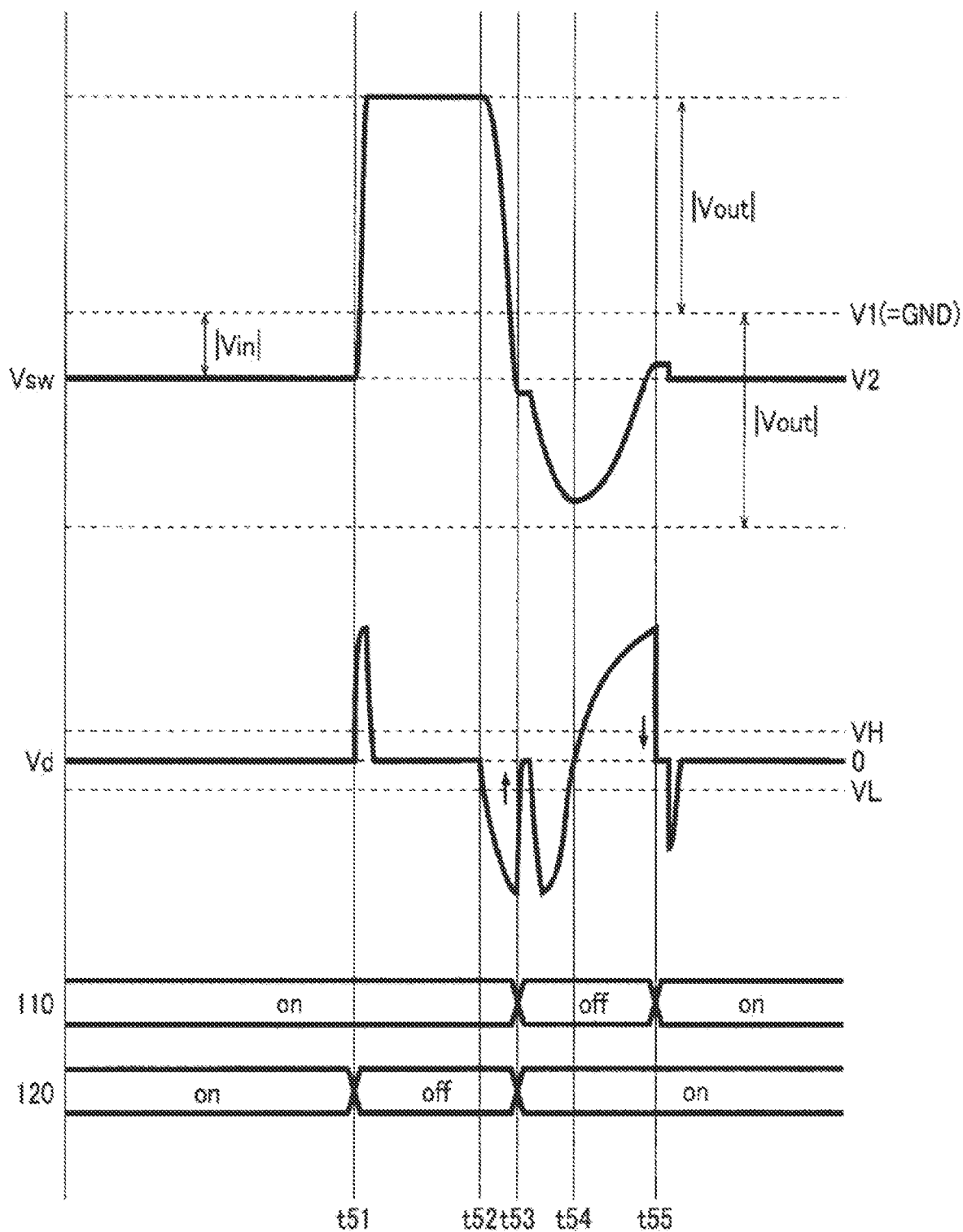
FIG. 11 is a diagram illustrating a fifth example of the individual ZVS control.

FIG. 11 is a diagram illustrating a fifth example of the individual ZVS control (ZVS control based on the differential voltage Vd). FIG. 11 depicts, in order from a top, the switch voltage Vsw, the differential voltage Vd, and the on/off states of the respective switch elements 110 and 120. In the following, description of a series of operation will be made including parts overlapping the aforementioned first example (FIG. 4) while focusing particularly on the differential voltage Vd.

Before time t51, both of the switch elements 110 and 120 are on. At this time, a primary current flows in a current path from the first node (terminal to which the voltage V1 is applied) of the alternating-current power source P through the primary winding 141 and the bidirectional switch X to the second node (terminal to which the voltage V2 is applied) of the alternating-current power source P, and energy is stored in the primary winding 141. Incidentally, at this point in time, the switch voltage Vsw coincides with the voltage V2. In addition, the differential voltage Vd is 0 V.

At time t51, when a predetermined energy is stored in the primary winding 141, the switch driving device 130 switches the bidirectional switch X from an on state to an off state. As described earlier, as for off timing of the bidirectional switch X, the passage of a predetermined time from on timing of the bidirectional switch X may be detected, or the reaching of a predetermined threshold value by an integrated value of the primary current may be detected.

At this time, the switch driving device 130 does not turn off both of the switch elements 110 and 120 at the same time, but turns off the switch element 120 (element to which a reverse voltage is applied) in which the inherent diode 122 is reverse biased while holding, in an on state, the switch element 110 (element to which a forward voltage is applied) in which the inherent diode 112 is forward biased.

Specifically, the switch driving device 130 outputs an off signal to the control terminal of the switch element 120 from the controller 133 via the driver 132 while continuing to output an on signal to the control terminal of the switch element 110 from the controller 133 via the driver 131.

Thereafter, as the switch voltage Vsw rises, the drain-to-source voltage (Vsw−V2) of the switch element 120 gradually rises while energy is stored in the inherent capacitance 123 of the switch element 120, the stray capacitances C1 to C4 of the transformer 140, and the inherent capacitance C5 of each of the diodes 161 and 162. Incidentally, the switch voltage Vsw rises until the absolute value of the switch voltage Vsw coincides with the output voltage Vout. At this time, the differential voltage Vd temporarily exceeds the threshold voltage VH, and thereafter falls below the threshold voltage VH again.

In addition, at this time, a voltage across the secondary winding 142a coupled to the primary winding 141 of the transformer 140 also gradually becomes higher. When the voltage across the secondary winding 142a then becomes higher than a total voltage of a voltage across the capacitor 154 and a forward drop voltage of the diode 161, a current flows into the capacitor 154 from the secondary winding 142a via the diode 161 to charge the capacitor 154.

At time t52, when all of the energy stored in the transformer 140 is discharged to the capacitor 154, the switch voltage Vsw changes to decrease due to the inherent capacitance 123 of the switch element 120, the stray capacitances C1 to C4 of the transformer 140, and the inherent capacitance C5 of each of the diodes 161 and 162, and thus the drain-to-source voltage of the switch element 120 starts to decrease gradually. At this time, the differential voltage Vd falls below the threshold voltage VL.

Then, at time t53, when the switch voltage Vsw decreases to coincide with the voltage V2, and the drain-to-source voltage of the switch element 120 becomes 0 V, the switch driving device 130 chooses this timing to turn on the switch element 120 and simultaneously turn off the switch element 110.

Specifically, the switch driving device 130 outputs an on signal to the control terminal of the switch element 120 from the controller 133 via the driver 132, while outputting an off signal to the control terminal of the switch element 110 from the controller 133 via the driver 131.

Incidentally, at time t53, the switch voltage Vsw is clamped to a voltage lower than the voltage V2 by a forward drop voltage of the inherent diode 122, and therefore the differential voltage Vd sharply rises from a negative value (<VL) to 0 V. Accordingly, the switch driving device 130 preferably turns on the switch element 120 and simultaneously turns off the switch element 110 in a timing in which the differential voltage Vd exceeds the threshold voltage VL. In addition, while there are also timings in which the differential voltage Vd exceeds the threshold voltage VL other than time t53, all of these timings are preferably ignored or masked.

At this time, the switch voltage Vsw decreases to a lower potential than the voltage V2 due to energy stored in the transformer 140. Thus, the drain-to-source voltage (V2−Vsw) of the switch element 110 rises, and a reverse voltage is applied to the switch element 110 (that is, the inherent diode 112 of the switch element 110 is reverse biased). Hence, the differential voltage Vd falls below the threshold voltage VL again.

However, at time t54, when the energy stored in the transformer 140 disappears, due to the inherent capacitance 113 of the switch element 110 and other capacitances, the switch voltage Vsw changes to rise, and the drain-to-source voltage of the switch element 110 starts to decrease gradually. At this time, the differential voltage Vd rises from a negative value (<VL) through 0 V to a positive value (>VH).

Then, at time t55, when the switch voltage Vsw rises to coincide with the voltage V2, and the drain-to-source voltage of the switch element 110 becomes 0 V, the switch driving device 130 chooses this timing to turn on the switch element 110 while holding the switch element 120 in an on state.

Specifically, the switch driving device 130 outputs an on signal to the control terminal of the switch element 110 from the controller 133 via the driver 131 while continuing to output an on signal to the control terminal of the switch element 120 from the controller 133 via the driver 132.

Incidentally, at time t55, the switch voltage Vsw is clamped to a voltage higher than the voltage V2 by a forward drop voltage of the inherent diode 112, and therefore the differential voltage Vd sharply decreases from a positive value (>VH) to 0 V. Accordingly, the switch driving device 130 preferably turns on the switch element 110 in a timing in which the differential voltage Vd falls below the threshold voltage VH. In addition, while there are also timings in which the differential voltage Vd falls below the threshold voltage VH other than time t55, all of these timings are preferably ignored or masked.

Thus, when the switch driving device 130 switches the bidirectional switch X from an off state to an on state, the switch driving device 130 performs first ZVS control so as to turn on the switch element 120 thus far held in an off state in timing in which the voltage across the switch element 120 becomes 0 V, and following the first ZVS control, performs second ZVS control so as to turn off the switch element 110 in timing of turning on the switch element 120, and turn on the switch element 110 in timing in which the voltage across the switch element 110 becomes 0 V.

By repeating the above switching control, at times of an on transition of the bidirectional switch X, it is possible to turn on each of the switch elements 110 and 120 individually in timing in which no charge is stored in the inherent capacitances 113 and 123 of the respective switch elements 110 and 120. Hence, a switching loss of each of the switch elements 110 and 120 can be reduced. It is therefore possible to suppress heat generation of the bidirectional switch X.

It is to be noted that while an example in which the individual ZVS control is performed on the basis of the differential voltage Vd is cited in the present embodiment, the differentiation processing is a mere example of how to process the switch voltage Vsw, and various modifications are conceivable. That is, the differentiating circuit 410 is one concrete example of a voltage detecting circuit that detects the switch voltage Vsw, and the method of processing the switch voltage Vsw may be any method as long as the individual ZVS control can be performed on the basis of the switch voltage Vsw.

Needless to say, the method of detecting zero cross timing is not limited to the above description at all. In the following, other zero cross detecting methods will be proposed by taking a fifth embodiment (FIG. 12) and a sixth embodiment (FIG. 13) as examples.

Fifth Embodiment

Figure 12:
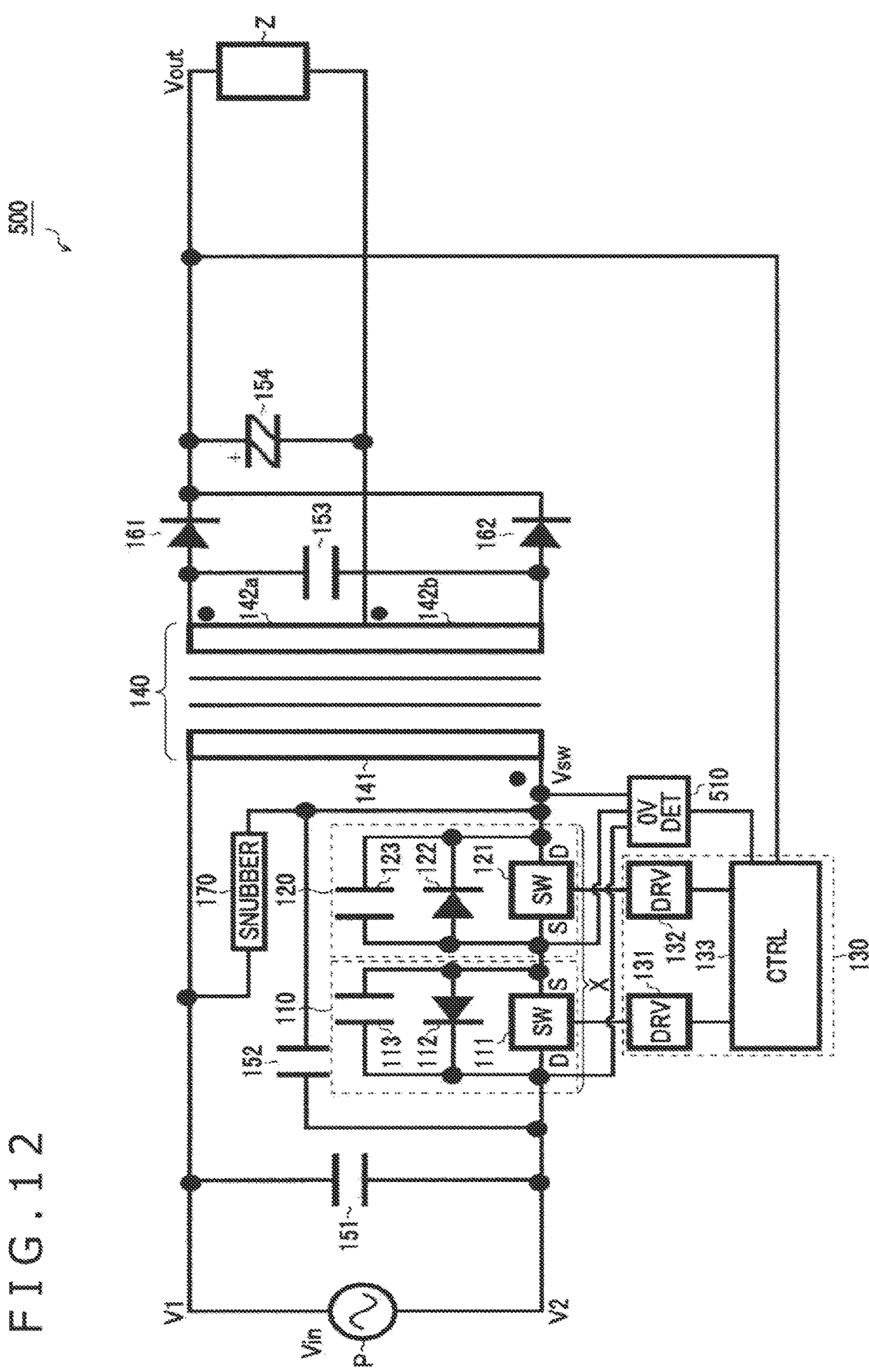
FIG. 12 is a diagram illustrating a fifth embodiment of the switching power supply.

FIG. 12 is a diagram illustrating a fifth embodiment of the switching power supply. While a switching power supply 500 according to the present embodiment is based on the first embodiment (FIG. 1), the switching power supply 500 includes a zero voltage detecting circuit 510 as measures for detecting zero cross timing for the individual ZVS control described above.

The zero voltage detecting circuit 510 detects that the drain-to-source voltages of the respective switch elements 110 and 120 (or divided voltages thereof) become 0 V, and outputs a result of the detection to the controller 133. The foregoing individual ZVS can be thereby realized. When integrated circuit (IC) formation is performed, in particular, it can be said that the zero voltage detecting circuit 510 can be formed easily.

Sixth Embodiment

Figure 13:
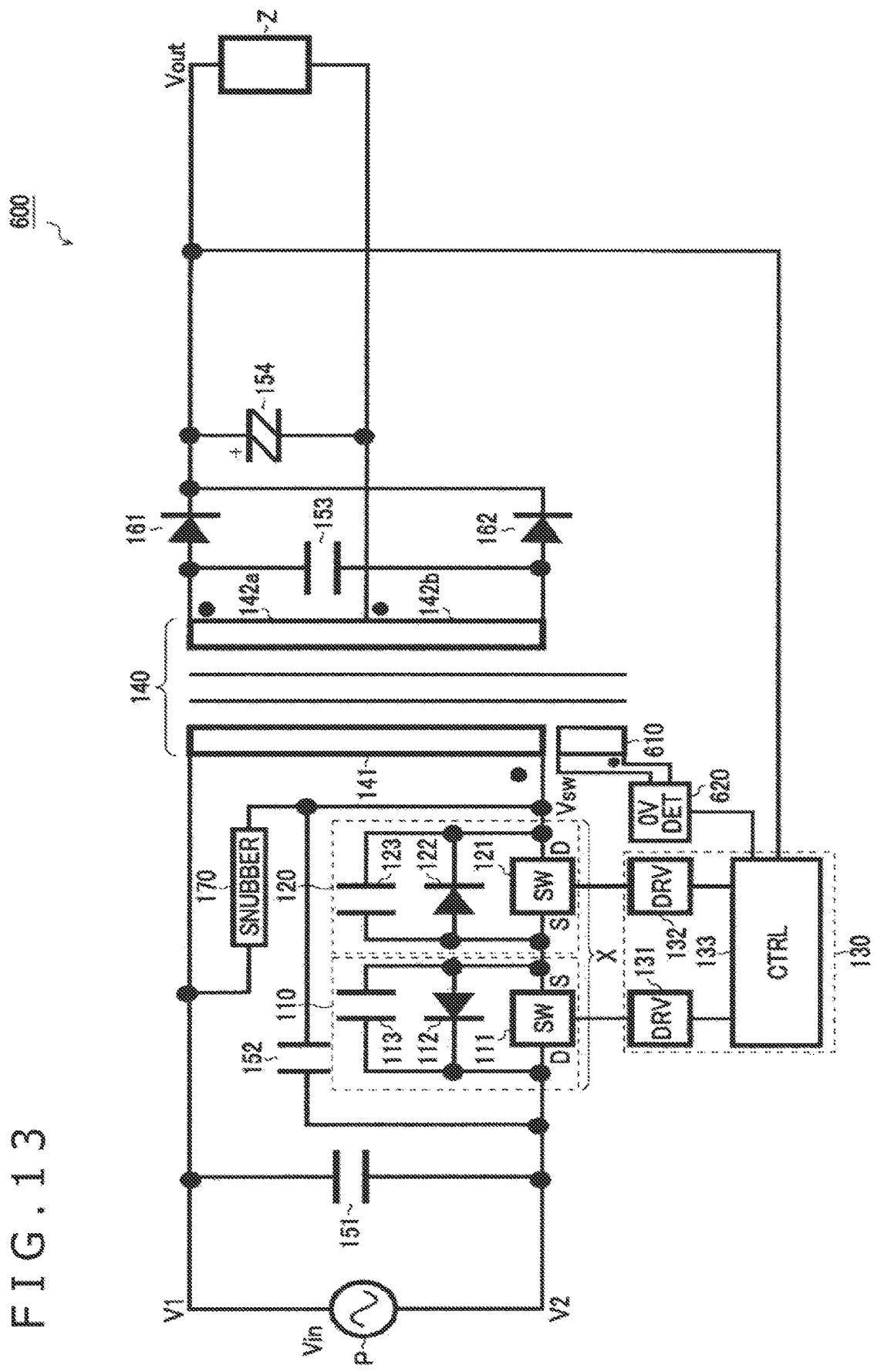
FIG. 13 is a diagram illustrating a sixth embodiment of the switching power supply.

FIG. 13 is a diagram illustrating a sixth embodiment of the switching power supply. While a switching power supply 600 according to the present embodiment is based on the first embodiment (FIG. 1), the switching power supply 600 includes an auxiliary winding 610 and a zero voltage detecting circuit 620 as measures for detecting zero cross timing for the individual ZVS control described above.

Incidentally, the auxiliary winding 610 is magnetically coupled to the primary winding 141 and the secondary winding 142. In addition, the zero voltage detecting circuit 620 detects an induced voltage occurring across the auxiliary winding 610, and outputs a result of the detection to the controller 133. The foregoing individual ZVS can be thereby realized.

In addition, the fourth embodiment (FIG. 10), the fifth embodiment (FIG. 12), and the sixth embodiment (FIG. 13) described above can be carried out in combination with each other within a scope where no inconsistency arises.

Seventh Embodiment

Figure 14:
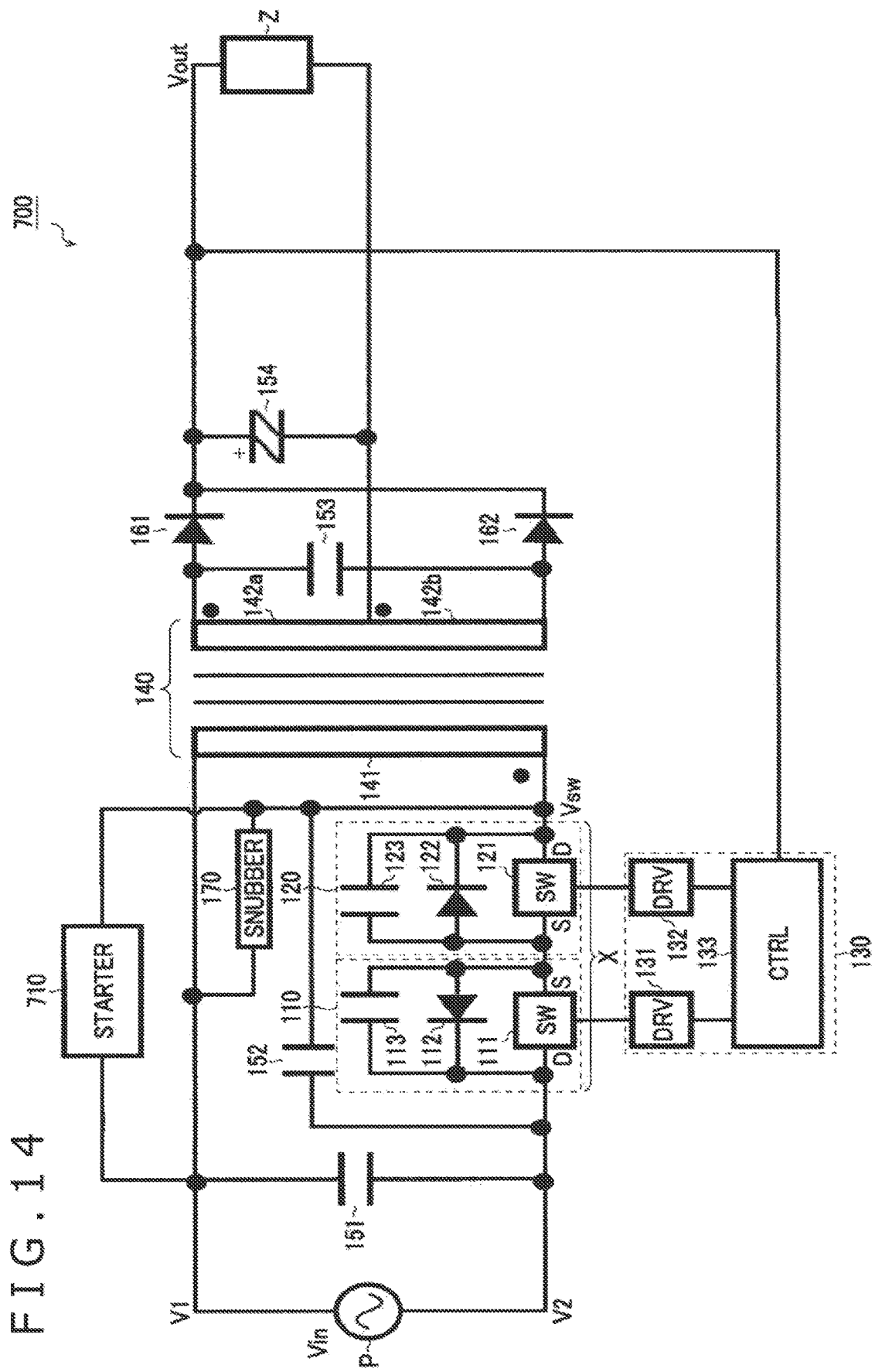
FIG. 14 is a diagram illustrating a seventh embodiment of the switching power supply.

FIG. 14 is a diagram illustrating a seventh embodiment of the switching power supply. While a switching power supply 700 according to the present embodiment is based on the first embodiment (FIG. 1), the switching power supply 700 further includes a starting circuit 710. The starting circuit 710 is connected across the primary winding 141. The starting circuit 710 performs preliminary charging of the capacitor 154 at a time of a start of the switching power supply 700. According to the present embodiment, the switching power supply 700 can be started stably and reliably.

Eighth Embodiment

Figure 15:
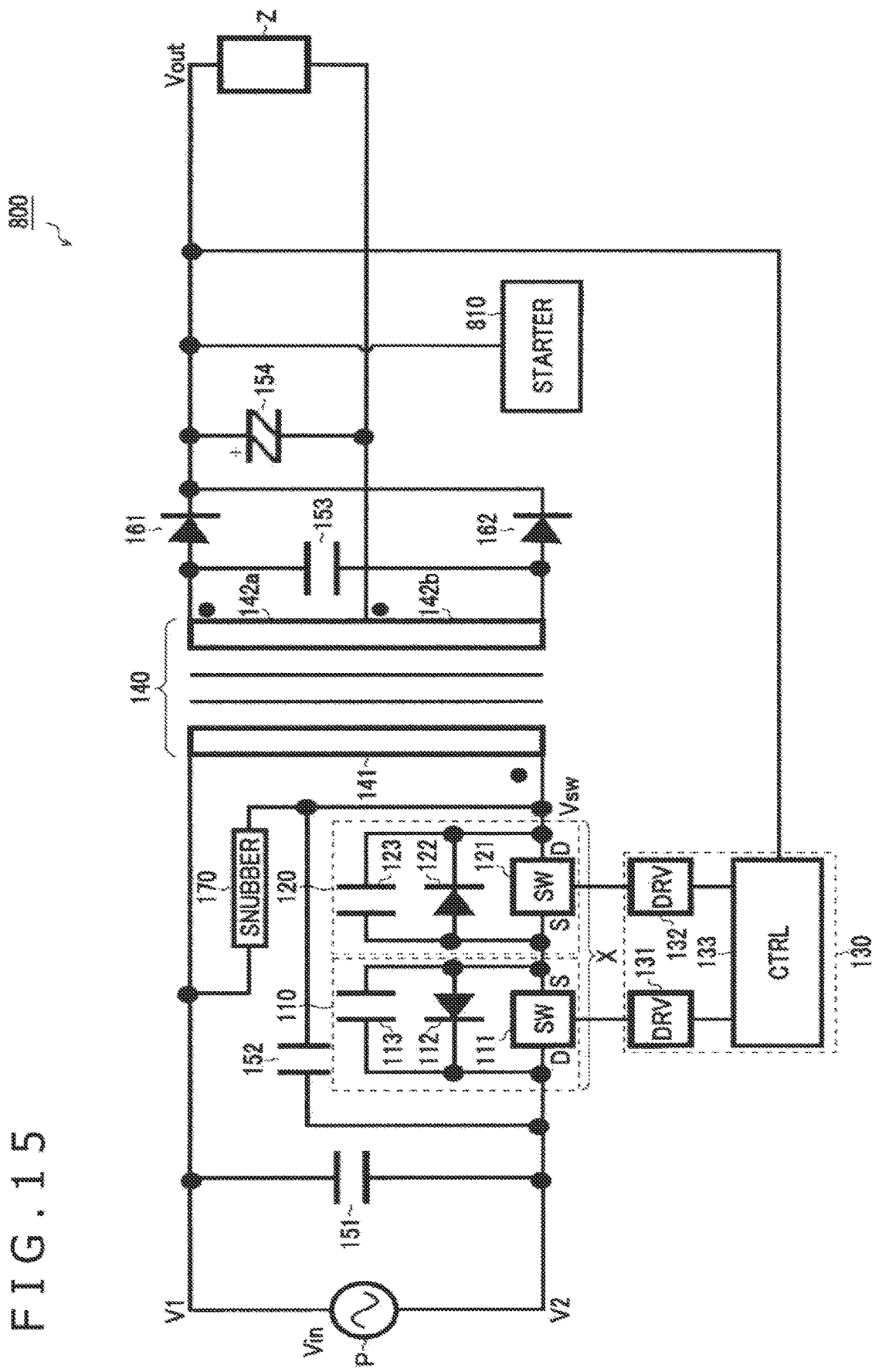
FIG. 15 is a diagram illustrating an eighth embodiment of the switching power supply.

FIG. 15 is a diagram illustrating an eighth embodiment of the switching power supply. While a switching power supply 800 according to the present embodiment is based on the first embodiment (FIG. 1), the switching power supply 800 further includes a starting circuit 810. The starting circuit 810 is directly connected to the capacitor 154 of the secondary circuit system. The starting circuit 810 performs preliminary charging of the capacitor 154 at a time of a start of the switching power supply 800. According to the present embodiment, the switching power supply 800 can be started stably and reliably.

Ninth Embodiment

Figure 16:
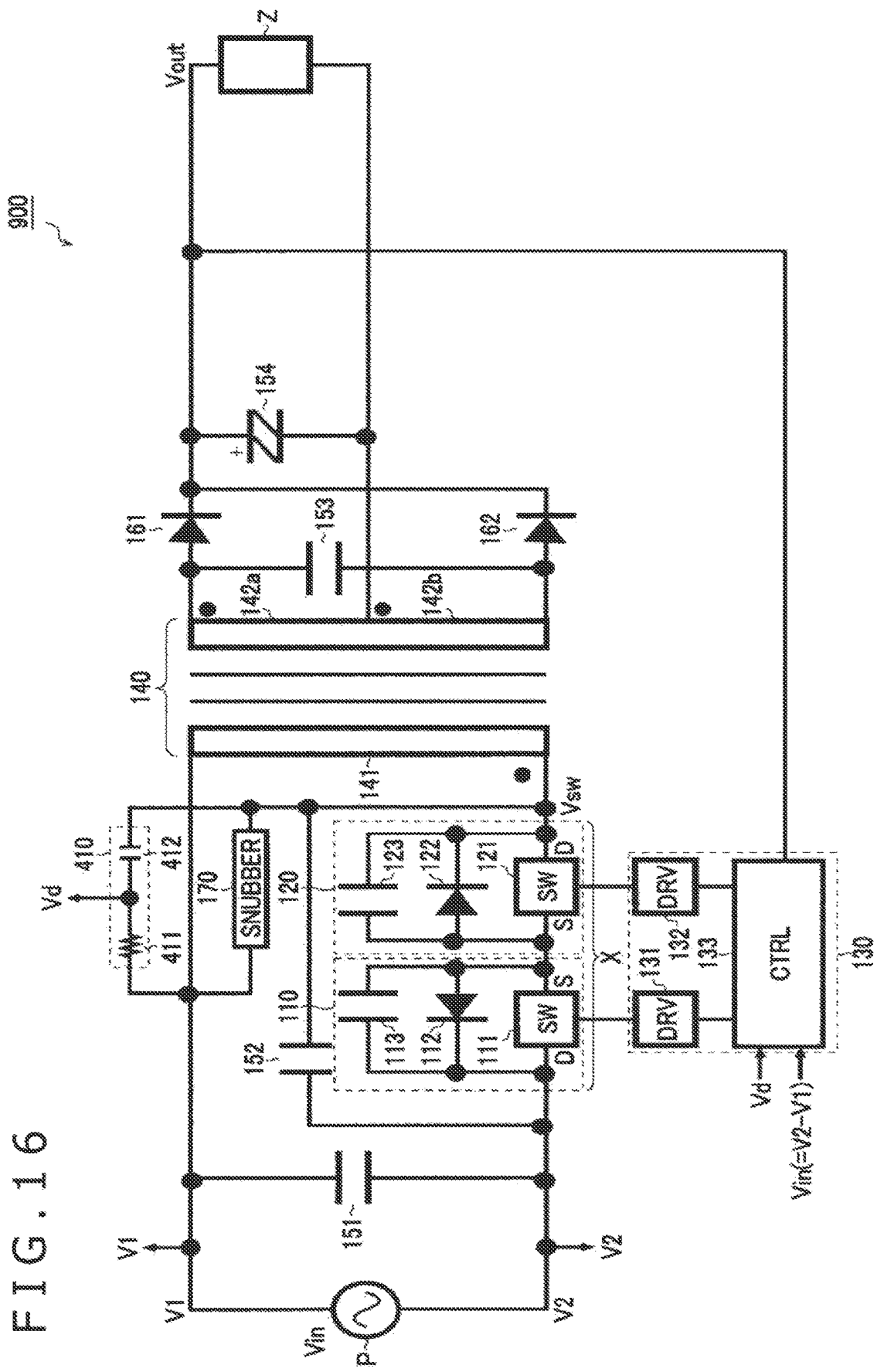
FIG. 16 is a diagram illustrating a ninth embodiment of the switching power supply.

FIG. 16 is a diagram illustrating a ninth embodiment of the switching power supply. While a switching power supply 900 according to the present embodiment is based on the aforementioned fourth embodiment (FIG. 10), the switching power supply 900 has a function of monitoring the magnitude of the alternating-current input voltage Vin (V2−V1) in addition to the differential voltage Vd by the switch driving device 130 (controller 133 in particular), and performing driving control of the bidirectional switch X on the basis of a result of the monitoring. In the following, the technical significance of adding such a function will be described in detail.

Figure 17:
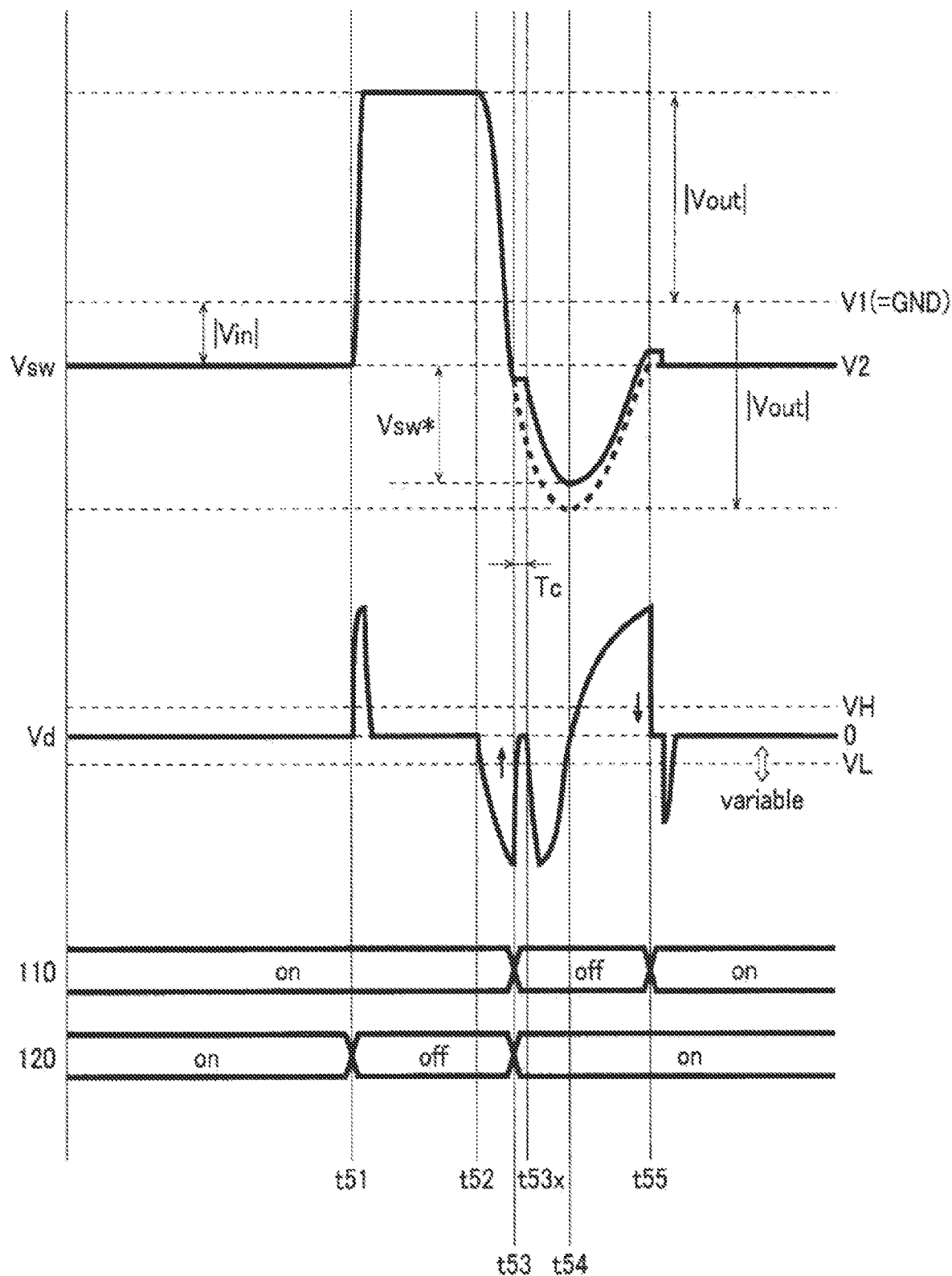
FIG. 17 is a diagram illustrating a decrease in efficiency due to clamping operation.

FIG. 17 is a diagram of assistance in explaining a decrease in efficiency due to clamping operation in zero cross timing. The present figure basically has the same contents as in the aforementioned FIG. 11. However, the figure clearly illustrates a clamping period Tc (from time t53 to time t53x) in zero cross timing, and depicts an ideal waveform of the switch voltage Vsw (that is, a waveform when Tc=0) by a broken line.

As described with reference to the aforementioned FIG. 11, the switch driving device 130 (controller 133 in particular) determines the on/off timing of each of the switch elements 110 and 120 according to a result of comparison of the differential voltage Vd with the threshold voltages VH and VL (see times t53 and t55).

The clamping period Tc (from time t53 to time t53x) in the present figure corresponds to a period during which the switch voltage Vsw is clamped to a voltage lower than the voltage V2 by the forward drop voltage of the inherent diode 122. In such a clamping period Tc, energy returns to the input side. As a result, an amount of dive Vsw* of the switch voltage Vsw (difference between a lower side peak value (<V2) of the switch voltage Vsw and the voltage V2) becomes smaller than in an ideal waveform, and the energy that can be fed to the output side is correspondingly decreased. Thus, efficiency is decreased.

Incidentally, while the present figure illustrates the case where Vin<0 (V1>V2), a decrease in efficiency due to clamping operation can occur also in the case where Vin>0 (V1<V2) for basically similar reasons to the foregoing.

Accordingly, to shorten the above-described clamping period Tc, the switching power supply 900 according to the present embodiment has a function of monitoring the magnitude (a positive or negative sign and an absolute value) of the alternating-current input voltage Vin (V2−V1) in addition to the differential voltage Vd by the switch driving device 130 (controller 133 in particular), and performing driving control of the bidirectional switch X (including processing of adjusting the threshold voltages VH and VL) on the basis of a result of the monitoring.

Figure 18:
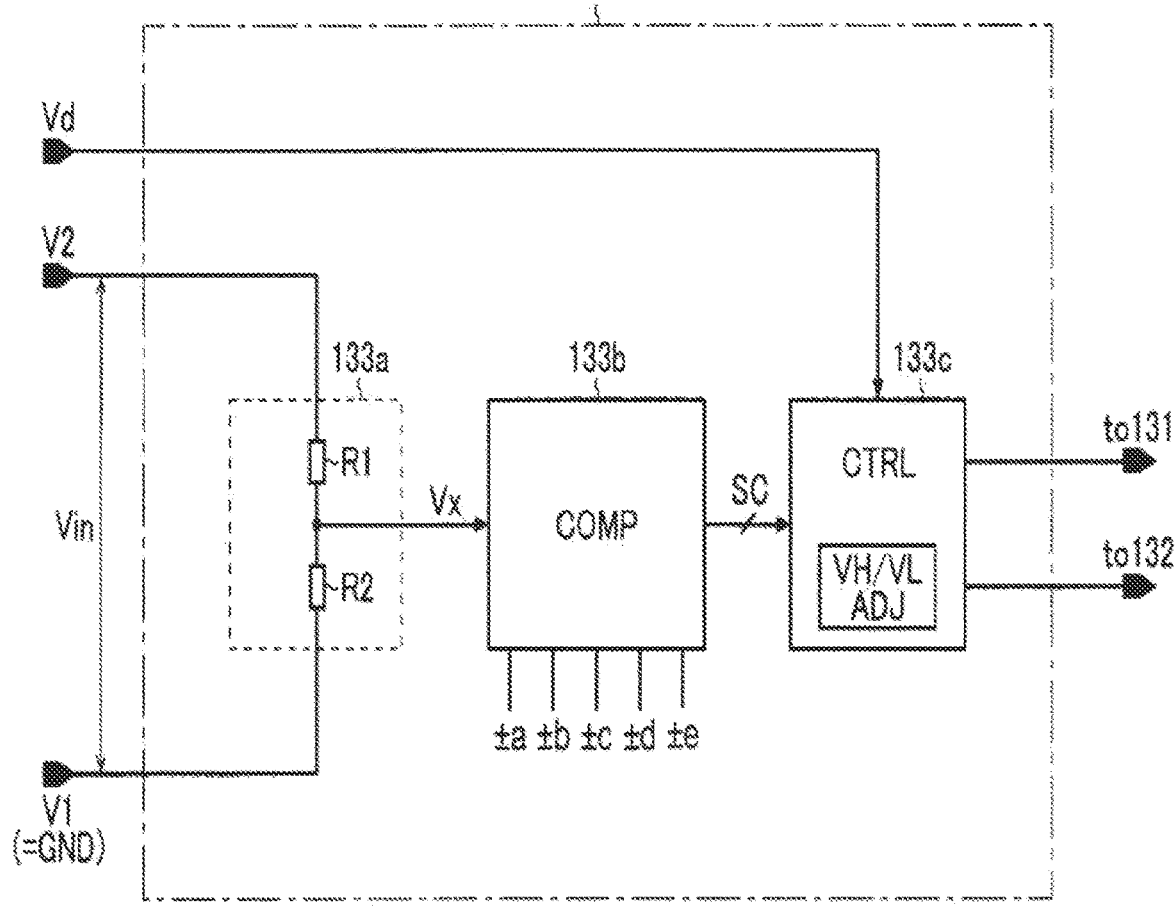
FIG. 18 is a diagram illustrating an example of a configuration of principal parts of a controller.

FIG. 18 is a diagram illustrating an example of a configuration of principal parts of the controller 133. The controller 133 in the present configuration example includes a voltage dividing unit 133a, a comparing unit 133b, and a control unit 133c.

The voltage dividing unit 133a includes resistances R1 and R2 connected in series with each other between a terminal to which the voltage V2 is applied and a terminal to which the voltage V1 (GND) is applied. The voltage dividing unit 133a outputs a divided voltage Vx corresponding to the alternating-current input voltage Vin from a connection node between the resistances R1 and R2.

The comparing unit 133b compares the divided voltage Vx with each of predetermined threshold voltages (±a, ±b, ±c, ±d, and ±e in the present figure, where 0<|a|<|b|<|c|<|d|<|e|), and outputs a plurality of comparison signals SC. Incidentally, the number (kinds) of the threshold voltages compared with the divided voltage Vx is not limited to this. In addition, in place of the comparing unit 133b (comparator), an amplifier may be used which generates an error signal ERR corresponding to a difference between the divided voltage Vx and a predetermined reference voltage Vref (Vref−Vx).

The control unit 133c performs driving control of each of the drivers 131 and 132 according to the comparison signals SC. For example, the control unit 133c determines the magnitude (a positive or negative sign and an absolute value) of the alternating-current input voltage Vin from a logical combination of the plurality of comparison signals SC, and performs various internal controls (processing of adjusting the threshold voltages VH and VL, processing of stopping the switching of the bidirectional switch X, processing of enabling the second ZVS control, and the like, which will be described later in detail) on the basis of a result of the determination.

Figure 19:
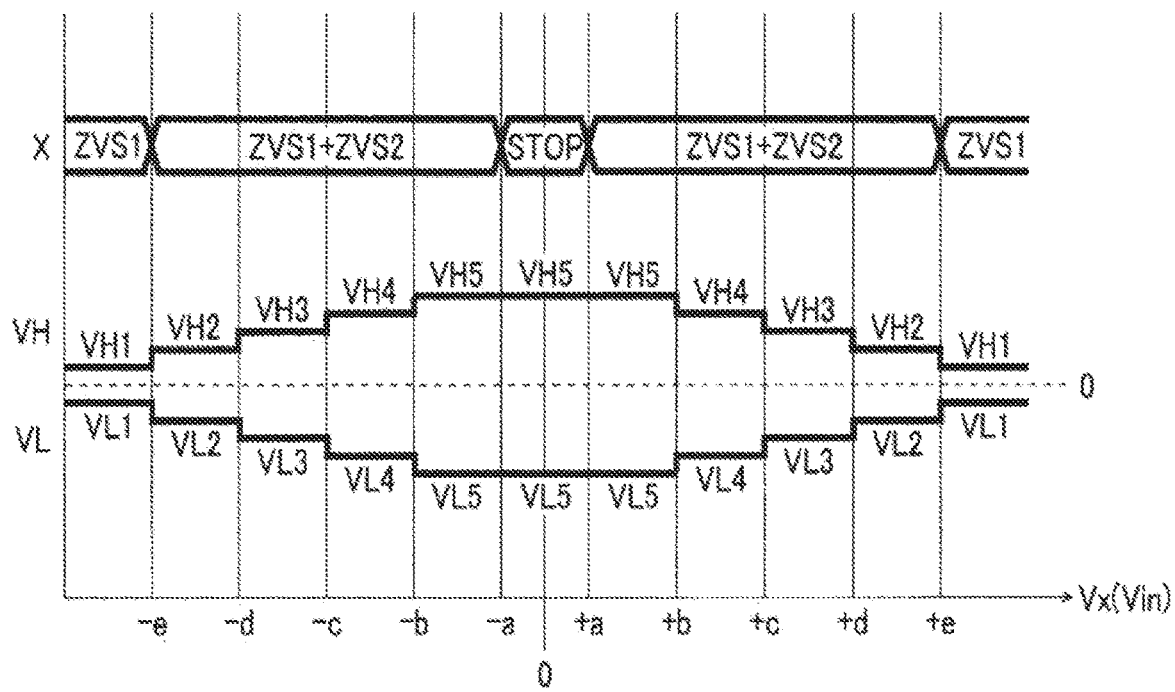
FIG. 19 is a diagram illustrating an example of internal control of the controller.
Figure 20:
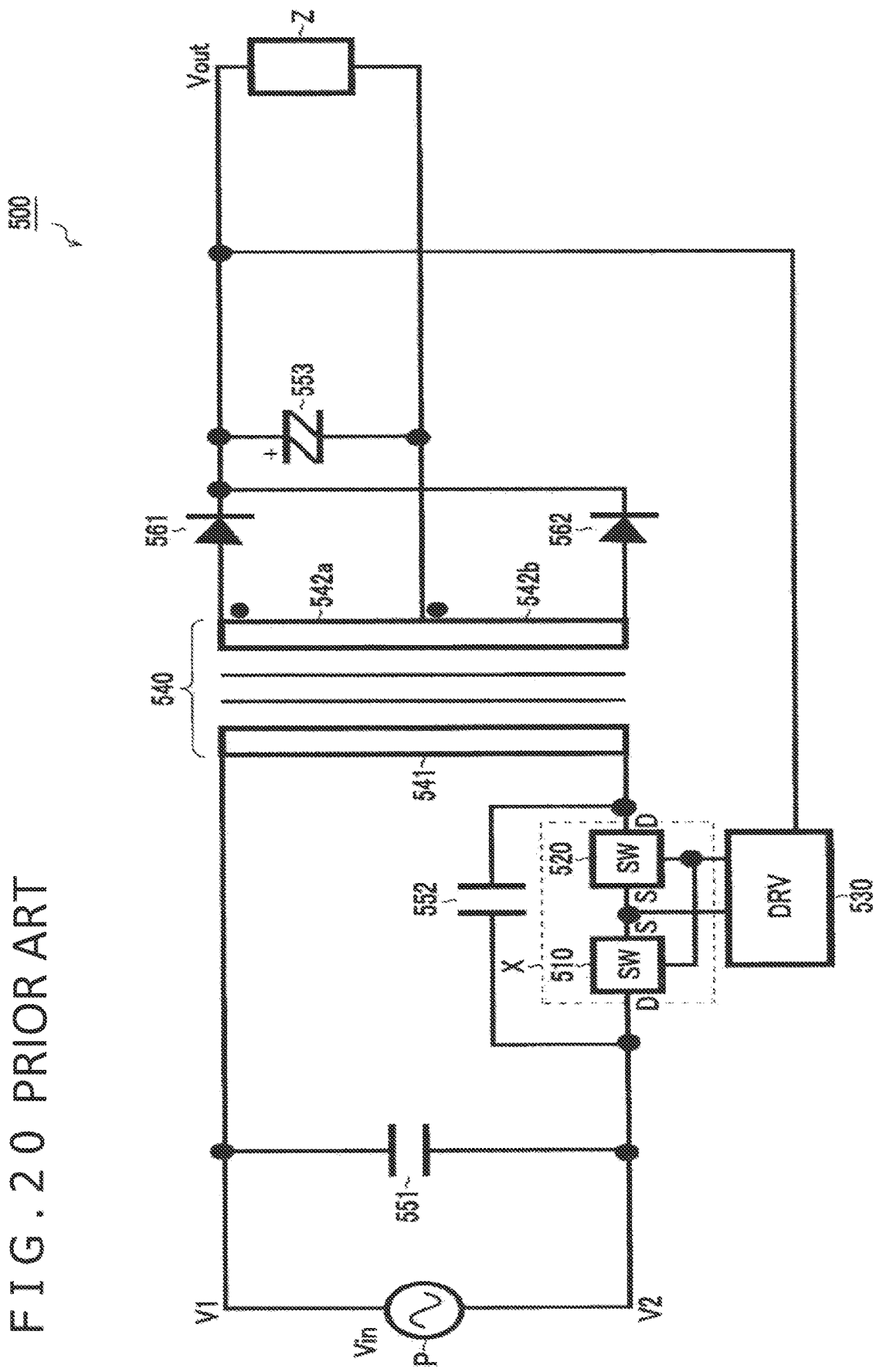
FIG. 20 is a diagram illustrating an existing example of the switching power supply.

FIG. 19 is a diagram illustrating an example of internal control of the controller 133. FIG. 19 depicts, in order from a top, the operation mode of the bidirectional switch X and the threshold voltages VH and VL. Incidentally, an axis of abscissas in the present figure indicates the magnitude of the divided voltage Vx (or in turn the alternating-current input voltage Vin).

In addition, in the following description, suppose that as for voltage values VH1 to VH5 that the threshold voltage VH (>0) on the positive side can assume, |VH1|<|VH2|<|VH3|<|VH4|<|VH5|, and suppose that as for voltage values VL1 to VL5 that the threshold voltage VL (<0) on the negative side can assume, |VL1|<|VL2|<|VL3|<|VL4|<|VL5|.

In addition, settings may be made such that |VH1|=|VL1|, |VH2|=|VL2|, |VH3|=|VL3|, |VH4|=|VL4|, and |VH5|=|VL5|.

In addition, the voltage values VH1 to VH5 that the threshold voltage VH on the positive side can assume and the voltage values VL1 to VL5 that the threshold voltage VL on the negative side can assume are preferably each allowed to be set optionally by a user.

When Vx<−e, for example, the threshold voltage VH is set at the voltage value VH1, and the threshold voltage VL is set at the voltage value VL1.

When −e<Vx<−d, for example, the threshold voltage VH is set at the voltage value VH2, and the threshold voltage VL is set at the voltage value VL2.

When −d<Vx<−c, for example, the threshold voltage VH is set at the voltage value VH3, and the threshold voltage VL is set at the voltage value VL3.

When −c<Vx<−b, for example, the threshold voltage VH is set at the voltage value VH4, and the threshold voltage VL is set at the voltage value VL4.

When −b<Vx<+b, for example, the threshold voltage VH is set at the voltage value VH5, and the threshold voltage VL is set at the voltage value VL5. However, when −a<Vx<+a, the bidirectional switch X is in a stop mode STOP (to be described later in detail), and therefore each of the threshold voltages VH and VL may have any voltage value.

When +b<Vx<+c, for example, the threshold voltage VH is set at the voltage value VH4, and the threshold voltage VL is set at the voltage value VL4.

When +c<Vx<+d, for example, the threshold voltage VH is set at the voltage value VH3, and the threshold voltage VL is set at the voltage value VL3.

When +d<Vx<+e, for example, the threshold voltage VH is set at the voltage value VH2, and the threshold voltage VL is set at the voltage value VL2.

When +d<Vx, for example, the threshold voltage VH is set at the voltage value VH1, and the threshold voltage VL is set at the voltage value VL1.

Thus, the switch driving device 130 (controller 133 in particular) adjusts the threshold voltages VH and VL according to the magnitude (a positive or negative sign and an absolute value) of the alternating-current input voltage Vin.

More specifically, the switch driving device 130 (controller 133 in particular) increases the absolute values of the threshold voltages VH and VL such that the smaller the absolute value of the alternating-current input voltage Vin, the earlier the timing of crossing of the threshold voltages VH and VL by the differential voltage Vd.

An operation of adjusting the threshold voltage VL will be described with reference to the aforementioned FIG. 17, for example, by taking the case where Vin <0 (V1>V2) as an example. In this case, the larger the absolute value of the alternating-current input voltage Vin, the smaller the amount of dive Vsw* of the switch voltage Vsw, and in turn the smaller an amount of change in the differential voltage Vd (lower side peak value of the differential voltage Vd).

Therefore, unless the absolute value of the threshold voltage VL is set sufficiently small, the differential voltage Vd may not fall below the threshold voltage VL, and change timing of the differential voltage Vd (timing in which the differential voltage Vd that has fallen below the threshold voltage VL exceeds the threshold voltage VL again) may not be detected.

On the other hand, the smaller the absolute value of the alternating-current input voltage Vin, the larger the amount of dive Vsw* of the switch voltage Vsw, and in turn the larger the amount of change in the differential voltage Vd (lower side peak of the differential voltage Vd). Hence, by setting the absolute value of the threshold voltage VL large in a range in which the change timing of the differential voltage Vd can be detected, it is possible to advance the timing of crossing of the threshold voltage VL by the differential voltage Vd, and shorten the clamping period Tc.

When the clamping period Tc is shortened, the energy returning to the input side is reduced. As a result, the amount of dive Vsw* of the switch voltage Vsw approaches the ideal waveform, and the energy that can be fed to the output side is correspondingly increased. It is thus possible to improve efficiency.

Incidentally, while the clamping period Tc is originally very short, a delay of a few ten ns here obviously affects the amount of dive Vsw* of the switch voltage Vsw (in turn efficiency). An improvement in efficiency is a few hundredths of a percent to 0.2%, which may appear to have a small improvement effect. However, the efficiencies of switching power supplies these days have already reached a level of 99%, and a further efficiency improvement therefrom is desired. In view of this, it is understood that an improvement of a few tenths of a percent has a very great impact.

In addition, when the topology of the circuit proposed in the present embodiment is adopted, a highly efficient AC/DC converter or isolated power supply can be formed easily with a part configuration sold anywhere.

In addition, shortening the clamping period Tc increases the amount of dive Vsw* of the switch voltage Vsw even in a case of a high alternating-current input voltage Vin. Hence, the range of the alternating-current input voltage Vin in which the change timing of the differential voltage Vd can be detected correctly is expanded.

Incidentally, as is clear from the above description, in the case where Vin <0 (V1>V2), the processing of adjusting the threshold voltage VL contributes to the shortening of the clamping period Tc. Thus, the threshold voltage VH may be set as a fixed value (for example, the voltage value VH1).

In addition, though not illustrated anew, in the case where Vin >0 (V1<V2), as opposed to the foregoing, the processing of adjusting the threshold voltage VH contributes the shortening of the clamping period Tc. Thus, the threshold voltage VL may be set as a fixed value (for example, the voltage value VL1).

In addition, a method of adjusting the threshold voltages VH and VL continuously by using an amplifier may be adopted in addition to the method of adjusting the threshold voltages VH and VL stepwise by using the comparator as illustrated in the present figure.

In addition, an example of adjusting the threshold voltages VH and VL according to the magnitude of the alternating-current input voltage Vin is cited in the above description. However, the adjustment of the threshold voltages VH and VL according to the waveform (degree of bluntness) of the differential voltage Vd is conceivable as another example.

For example, the switch driving device 130 (controller 133 in particular) preferably increases the absolute values of the threshold voltages VH and VL such that the blunter the waveform of the differential voltage Vd, the earlier the timing of crossing of the threshold voltages VH and VL by the differential voltage Vd.

Incidentally, detected as information regarding the waveform (degree of bluntness) of the differential voltage Vd is preferably, for example, a peak value of the differential voltage Vd, a time from a zero value to the peak value, or a slope at a time of a start of a change in the differential voltage Vd.

In a real machine, in particular, the threshold voltages VH and VL are preferably adjusted in consideration of both the magnitude of the alternating-current input voltage Vin and the waveform (degree of bluntness) of the differential voltage Vd. For example, in a case of a high alternating-current input voltage Vin, the absolute values of the threshold voltages VH and VL should be decreased. However, when the waveform of the differential voltage Vd is significantly blunted, the absolute values of the threshold voltages VH and VL should not be decreased. The threshold voltages VH and VL therefore needs to be adjusted in view of a balance between both.

In any case, in order to shorten the clamping period Tc, it can be said to be important to adjust the threshold voltages VH and VL as appropriate according to at least one of the magnitude of the alternating-current input voltage Vin and the waveform of the differential voltage Vd, instead of setting the threshold voltages VH and VL as fixed values.

Description will next be made of the operation mode of the bidirectional switch X which is illustrated in a top part of the present figure. First, an operation mode [ZVS1+ZVS2] in which both the first ZVS control and the second ZVS control described earlier are performed is set in a first input voltage range (−e<Vin <−a and +a<Vin <+e) (see FIG. 4, FIG. 5, FIG. 6, and the like).

On the other hand, an operation mode [ZVS1] in which only the first ZVS control is performed is set in a second input voltage range (Vin <−e and +e<Vin) (see FIG. 7 and the like). That is, the switch driving device 130 (controller 133 in particular) switches to the operation mode [ZVS1] in which, while one of the switch elements 110 and 120 is maintained in an on state, the other is turned on/off, when the absolute value of the alternating-current input voltage Vin is larger than a predetermined upper limit value (e in the present figure). It is thereby possible to suppress heat generation of the bidirectional switch X without need of severe timing control, as also described earlier.

In addition, a stop mode [STOP] in which the driving of the bidirectional switch X is stopped is set in a third input voltage range (−a<Vin <+a). That is, the switch driving device 130 (controller 133 in particular) switches to the stop mode [STOP] in which both of the switch elements 110 and 120 are turned off when the absolute value of the alternating-current input voltage Vin is smaller than a predetermined lower limit value (a in the present figure). Thus, the driving of the bidirectional switch X is stopped in the input voltage range in which sufficient excitation is not expected even when the bidirectional switch X is driven. It is thereby possible to reduce a switching loss of each of the switch elements 110 and 120, and thus achieve an improvement in efficiency.

OTHER MODIFICATIONS

It is to be noted that various technical features disclosed in the present specification can be modified variously besides the foregoing embodiments without departing from the spirit of technical creation thereof. That is, the foregoing embodiments are to be considered illustrative and not restrictive in all respects, and it is to be understood that the technical scope of the present disclosure is not limited to the foregoing embodiments, but includes all modifications belonging within meanings and ranges equivalent to claims.

The switch driving device disclosed in the present specification can be used, for example, as measures for driving a bidirectional switch used in a switching power supply.

What is claimed is:

1. A switching power supply, comprising:
a primary winding to which an alternating-current input voltage is applied;
a secondary winding electromagnetically coupled to the primary winding;
a bidirectional switch connected in series with the primary winding;
a resonance capacitor connected in parallel with at least one of the bidirectional switch or the primary winding;
a full-wave rectifier circuit configured to perform full-wave rectification of an induced voltage occurring in the secondary winding;
a smoothing capacitor configured to smooth output of the full-wave rectifier circuit;
a voltage detecting circuit connected to the bidirectional switch; and
a switch driving device, wherein the switch driving device comprises:
circuitry configured to perform individual zero voltage switching control of a first switch element and a second switch element, wherein
the first switch element and the second switch element form a bidirectional switch,
the second switch element is a switch element that switches from a state in which both the first switch element and the second switch element are on to an off state,
the bidirectional switch switches from an on state to the off state when the second switch element is set to the off state from the on state while the first switch element remains on,
when the bidirectional switch is switched from the off state to the on state, the circuitry is further configured to perform first zero voltage switching control so as to turn on the second switch element in timing in which a voltage across the second switch element becomes 0 V, and the first switch element is switched from the on state to the off state, and
when the bidirectional switch is switched from the off state to the on state, the circuitry is further configured to perform second zero voltage switching control following the first zero voltage switching control so as to turn off the first switch element in timing in which the second switch element is turned on, and turn on the first switch element in timing in which a voltage across the first switch element becomes 0 V;
and the switch driving device is configured to:
drive the bidirectional switch; and
perform the individual zero voltage switching control based on a switch voltage appearing between the second switch element and the primary winding.

2. The switching power supply according to claim 1, wherein
the voltage detecting circuit detects a differential voltage obtained by differentiating the switch voltage, and
the switch driving device is further configured to perform the individual zero voltage switching control based on the differential voltage.

3. The switching power supply according to claim 2, wherein
the switch driving device is further configured to determine on/off timing of each of the first switch element and the second switch element according to a result of comparison between the differential voltage and a predetermined threshold voltage.

4. The switching power supply according to claim 3, wherein
the switch driving device is further configured to adjust the predetermined threshold voltage according to at least one of a magnitude of the alternating-current input voltage and a waveform of the differential voltage.

5. The switching power supply according to claim 4, wherein the switch driving device is further configured to adjust the predetermined threshold voltage such that the smaller an absolute value of the alternating-current input voltage, or blunter the waveform of the differential voltage, earlier a timing of crossing of the predetermined threshold voltage by the differential voltage.

6. The switching power supply according to claim 5, wherein the switch driving device is further configured to detect a peak value of the differential voltage, a time from a zero value to the peak value, or a slope at a time of a start of a change in the differential voltage as information regarding the waveform of the differential voltage.

7. The switching power supply according to claim 6, wherein the switch driving device is further configured to stop the driving of the bidirectional switch when the absolute value of the alternating-current input voltage is smaller than a predetermined lower limit value.

8. The switching power supply according to claim 7, wherein the switch driving device is further configured to switch the bidirectional switch from the on state to the off state when the absolute value of the alternating-current input voltage is larger than a predetermined upper limit value.

\* \* \* \* \*